United States Patent
Zhang et al.

(10) Patent No.: US 12,156,273 B2
(45) Date of Patent: Nov. 26, 2024

(54) LINK FAILURE RECOVERY METHOD AND APPARATUS

(71) Applicant: Huawei Technologies Co., Ltd., Guangdong (CN)

(72) Inventors: Di Zhang, Shenzhen (CN); Kunpeng Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 466 days.

(21) Appl. No.: 17/449,384

(22) Filed: Sep. 29, 2021

(65) Prior Publication Data

US 2022/0022274 A1 Jan. 20, 2022

Related U.S. Application Data

(63) Continuation of application No. PCT/CN2020/083104, filed on Apr. 3, 2020.

(30) Foreign Application Priority Data

Apr. 10, 2019 (CN) .......................... 201910286536.7

(51) Int. Cl.
*H04W 76/19* (2018.01)
*H04L 5/00* (2006.01)
(Continued)

(52) U.S. Cl.
CPC ........... *H04W 76/19* (2018.02); *H04L 5/0048* (2013.01); *H04W 36/083* (2023.05);
(Continued)

(58) Field of Classification Search
CPC ..... H04W 76/19; H04W 36/00; H04W 76/15; H04W 36/08; H04W 36/30;
(Continued)

(56) References Cited

U.S. PATENT DOCUMENTS

| 2018/0323856 A1 | 11/2018 | Xiong et al. |
| 2019/0037423 A1 | 1/2019 | Yu et al. |

(Continued)

FOREIGN PATENT DOCUMENTS

| CN | 107820266 A | 3/2018 |
| CN | 108377577 A | 8/2018 |

(Continued)

OTHER PUBLICATIONS

3GPP TSG RAN WG1 Meeting #96bis, R1-1903977,Beam failure recovery for SCell,Huawei, HiSilicon,Xi an, China, Apr. 8 12, 2019, total 7 pages.

(Continued)

*Primary Examiner* — Jung H Park
(74) *Attorney, Agent, or Firm* — WOMBLE BOND DICKINSON (US) LLP

(57) ABSTRACT

This application provides a link failure recovery method and apparatus. When a link failure occurs and link recovery is performed, if a terminal device determines that no new link is identified, according to the method, the terminal device may report, to a network device, an identifier of a cell in which the link failure occurs and information indicating whether a new link is identified for each cell. The network device may reconfigure a new resource set based on the information, and notify the terminal device of the new resource set by using downlink control information DCI. In other words, a reference signal in another resource set is triggered by using the DCI, and the reference signal in the resource set is reported for link recovery.

12 Claims, 6 Drawing Sheets

(51) Int. Cl.
*H04W 36/00* (2009.01)
*H04W 36/08* (2009.01)
*H04W 36/30* (2009.01)
*H04W 76/15* (2018.01)

(52) U.S. Cl.
CPC ......... *H04W 36/302* (2023.05); *H04W 76/15* (2018.02); *H04W 36/0064* (2023.05); *H04W 36/00838* (2023.05)

(58) Field of Classification Search
CPC ......... H04W 36/0055; H04W 36/0083; H04W 36/0085; H04W 36/305; H04W 76/18; H04L 5/0048; H04L 5/0094
See application file for complete search history.

(56) References Cited

U.S. PATENT DOCUMENTS

| | | | |
|---|---|---|---|
| 2019/0053312 A1 | 2/2019 | Xia et al. | |
| 2020/0100311 A1* | 3/2020 | Cirik | H04W 72/23 |
| 2020/0137821 A1* | 4/2020 | Cirik | H04W 76/19 |
| 2020/0389220 A1* | 12/2020 | Kang | H04W 72/046 |
| 2022/0077917 A1* | 3/2022 | Nagaraja | H04B 7/088 |

FOREIGN PATENT DOCUMENTS

| | | |
|---|---|---|
| CN | 109391405 A | 2/2019 |
| EP | 3609225 A1 | 2/2020 |
| WO | 2018156601 A1 | 8/2018 |
| WO | 2018201990 A1 | 11/2018 |
| WO | 2018204255 A1 | 11/2018 |

OTHER PUBLICATIONS

CMCC, "Enhancements on multi-beam operation", 3GPP TSG RAN WG1 Meeting #96bis R1-1904736, Mar. 30, 2019, total 6 pages.

3GPP TS 38.321 V15.5.0:"3rd Generation Partnership Project;Technical Specification Group Radio Access Network; NR;Medium Access Control (MAC) protocol specification(Release 15)",Mar. 2019,total 78 pages.

3GPP TSG RAN WGI Meeting #96bis R1-1904209,LG Electronics Discussion on multi-beam based operations and enhancements,Mar. 30, 2019,total 14 pages.

Samsung, "Enhancements on multi-beam operation", 3GPP TSG RAN WG1 Meeting #96bis R1-1904450, Mar. 29, 2019,total 11 pages.

3GPP TSG-RAN WG1 Meeting #96,R1-1903044, Enhancements on Multi-beam Operation,Qualcomm Incorporated, Athens, Greece, Feb. 25 Mar. 1, 2019, total 19 pages.

Huawei et al:"Beam failure recovery" 3GPP Raft; R1-1708135, May 14, 2017,XP051273331, total 9 pages.

Institute for Information Industry (III):"Discussion on beam failure recoverymechanism" 3GPP Draft; R1-1708874,May 14, 2017,XP051274057,total 5 pages.

* cited by examiner

LINK FAILURE RECOVERY METHOD AND APPARATUS

CROSS-REFERENCE TO RELATED APPLICATIONS

This application is a continuation of International Application No. PCT/CN2020/083104, filed on Apr. 3, 2020, which claims priority to Chinese Patent Application No. 201910286536.7, filed on Apr. 10, 2019. The disclosures of the aforementioned applications are hereby incorporated by reference in their entireties.

TECHNICAL FIELD

This application relates to the communications field, and more specifically, to a link failure recovery method and apparatus in the communications field.

BACKGROUND

In a process of communication between a terminal device and a network device, the terminal device needs to detect an available beam, and transmit information about the available beam to the network device, to establish a link connection. When detecting a link fault (beam failure), the terminal device may send a beam failure recovery request (BFRQ) message to the network device, to notify the network device of the link failure, and report information about a detected new available beam to the network device. The network device sends a beam failure recovery response (BFRR) message to the terminal device, to indicate new link information to the terminal device, so that the terminal device can establish a new link connection to the network device, thereby recovering a link.

If the terminal device cannot determine a new link or cannot find an available beam, link failure recovery fails. Consequently, link communication is interrupted, and communication efficiency is reduced.

SUMMARY

This application provides a link failure recovery method and apparatus. The method can increase a link failure recovery probability, reduce a link failure recovery delay, and improve link failure recovery reliability.

According to a first aspect, a link failure recovery method is provided. The link failure recovery method includes: determining that M first cells in which a link failure occurs are in a first state, where the first state is a state in which each of the M first cells has no first reference signal that satisfies a first preset condition, $M \geq 1$, and M is an integer; sending a first request message on a first resource, where the first request message is used to indicate cell information of the M first cells; receiving a response message of the first request message on a second resource, where the response message of the first request message is used to indicate a second reference signal resource set, the second reference signal resource set includes resources of N second reference signals used to recover the M first cells, $N \geq 1$, and N is an integer; and determining the second reference signal resource set based on the response message of the first request message.

Specifically, in this application, a terminal device detects a current link, and determines that a link failure occurs in L first cells. The L first cells include a first cell for which a new link is identified and M first cells for which no new link is identified. In other words, each of the M first cells has no new link. $L \geq M \geq 1$, and L and M are integers. That is, in this application, the first request information is used to indicate that no new link is identified for each of the M first cells in which the link failure occurs. The first state is a state in which no new link is identified for each of the M first cells.

It should be understood that, the resources of the N second reference signals may be used to recover links of all the M cells, or used to recover links of some of the M cells. This is not limited in this application.

In one embodiment, there may be a plurality of types of response messages of the first request message. The first type is as follows: When the first request message indicates a new link for a first cell with a new link, the response information of the first request message is information sent on a third resource based on the new link (which may be a PDCCH sent by using the new link).

The second type is as follows: For a first cell without a new link, the response message of the first request message may indicate an aperiodic/periodic/semi-periodic reference signal resource set (the second reference signal resource set) or the like. Alternatively, the response message of the first request message is associated with a default reference signal resource set (for example, a reference signal resource set used for beam management BM, a reference signal resource set used for RRM measurement, or a reference signal resource set that uses another function). The reference signal resource set used for beam management (BM) may be a reference signal resource set with a repetition identifier being "off" (or may be a reference signal resource set with a repetition identifier being "on").

It should be understood that, in this embodiment, the response message of the first request message mainly refers to the second type.

It should be further understood that, that the response message of the first request message is used to indicate a second reference signal resource set may be that the response message of the first request message explicitly indicates the second reference signal resource set. For example, the response message of the first request message is configured by using higher layer signaling to be associated with a reference signal resource set. Alternatively, the response message of the first request message may implicitly indicate the second reference signal resource set. For example, the response message of the first request message is associated with a reference signal resource set by default. The reference signal resource set may be a reference signal resource set used for beam management BM, or may be a reference signal resource set used for RRM measurement, or may be a reference signal resource set that uses another function. The default reference signal resource set may be a reference signal resource set that uses another function, or may be a reference signal resource set predefined in a protocol. The second reference signal corresponding to the second reference signal resource set may be a CSI-RS, a TRS, an SSB, or the like.

In one embodiment, the terminal device reports, on an uplink resource (which may be a PUSCH) indicated by the response message of the first request message, information about some second reference signals in the second reference signal resource set.

It should be understood that, the first request message may be sent by using one or more request messages. This is not limited in this embodiment. In addition, the first request message may be a link failure request message (BFRQ), scheduling request information, or a combination of the two. This is not limited in this application. The first request message may alternatively be carried on one or more first resources. This is not limited in this embodiment. The first request message may further indicate that the link failure occurs in the M first cells.

In addition, the first resource and the second resource may be resources of a second cell. For example, the first cell may be an SCell, and the second cell may be a PCell.

It should be further understood that, in this application, the first preset condition may be that channel qualify of a reference signal is greater than or equal to a first preset threshold. In other words, that there is no first reference signal that satisfies the first preset condition may further include any one of the following cases: (1) No first reference signal resource set is configured, but the first preset threshold is configured. (2) A first reference signal resource set is configured, but the first preset threshold is not configured. (3) A first reference signal resource set and the first preset threshold are configured, but a first reference signal greater than the first preset threshold is not identified or does not exist. (4) Neither a first reference signal resource set nor the first preset threshold is configured. The first reference signal resource set may be referred to as a link failure recovery reference signal resource set, and the first preset threshold may be referred to as a link recovery threshold. This is not limited in this application.

It should be further understood that, the "channel quality" in this application may be at least one of reference signal received power (L1-reference signal received power, L1-RSRP), a signal to interference plus noise ratio (L1-signal to interference plus noise ratio, L1-SINR), a signal to interference plus noise ratio (SINR), a channel quality indicator (CQI), and the like.

In this application, after determining that there is no new link, the terminal device may detect DCI information in the second cell (for example, the PCell), to determine a new reference signal resource set. After determining that there is a new link, the terminal device may detect response information in the first cell based on the new link. This application includes but is not limited to this.

Based on the foregoing solution, when a link failure occurs and link recovery is performed, if the terminal device determines that no new link is identified, the terminal device may report, to the network device, an identifier of a cell in which the link failure occurs and information indicating that no new link is identified for the cell. The network device may reconfigure a new resource set based on the information, and notify the terminal device of the new resource set by using the response message of the first request message. In other words, a reference signal in another resource set is indicated by using the response message of the first request message, and the reference signal in the resource set is reported for link recovery. In this way, a link failure recovery probability can be increased, a link failure recovery delay can be reduced, and link failure recovery reliability can be improved.

In one embodiment, the cell information of the M first cells includes cell identifiers of the M first cells and/or information about the first state of the M first cells.

It should be understood that, "the cell information of the M first cells includes cell identifiers of the M first cells and/or information about the first state of the M first cells" may be replaced with "the cell information of the M first cells includes cell identifiers of the M first cells and information about the first state of the M first cells, or the cell information of the M first cells includes information about the first state of the M first cells"; or may be replaced with "the cell information of the M first cells includes cell identifiers of the M first cells and information about the first state of the M first cells"; or may be replaced with "the first request message is used to indicate cell identifiers of the M first cells and information about the first state of the M first cells, or the first request message is used to indicate information about the first state of the M first cells"; or may be replaced with "the first request message is used to indicate cell identifiers of the M first cells and/or information about the first state of the M first cells"; or may be replaced with "the first request message is used to indicate cell identifiers of the M first cells and information about the first state of the M first cells".

It should be understood that, in one embodiment, the cell information of the M first cells includes only the information about the first state. That is, the first request message indicates that the link failure occurs in a first cell (a cell in which the link failure occurs may not be indicated, and a range of cells in which the link failure occurs may be indicated, for example, the link failure occurs in a cell in a first group of cells) and indicates a state in which no new link can be identified for the cell in which the link failure occurs. Correspondingly, the network device may reconfigure some reference signal resources for link recovery.

The information about the first state of the M first cells may be understood as that the M first cells may share one first state, and the first state indicates that no new link is identified for all of the M first cells, or may be understood as that each of the M first cells has one first state (that is, there are M first states), and a first state corresponding to a cell indicates that no new link is identified for the first cell.

In one embodiment, for at least one of the cases (1), (2), and (4) in which there is no first reference signal that satisfies the first preset condition, the network device learns that in this case, the terminal device cannot obtain a first reference signal that satisfies the first preset condition, that is, the network device implicitly learns of the first state in this case. Therefore, the terminal device may only need to (explicitly or implicitly) report the cell identifiers of the M first cells, and does not need to report the information about the first state of the M first cells (in other words, the first request message implicitly indicates the information about the first state of the M first cells).

In one embodiment, for the case (3) in which there is no first reference signal that satisfies the first preset condition, the terminal device needs to report at least the information about the first state of the M first cells, so that the network device reconfigures or indicates a new reference signal resource set for link recovery.

It may be understood that, for the foregoing several cases, the first request message explicitly or implicitly indicates the information about the first state of the M first cells.

For example, the cell information of the M first cells includes M cell identifiers and the information about the first state, and the information about the first state may indicate that no new link is identified for the M SCells.

Based on the foregoing implementation, the network device may configure one or more resources for a cell in which a link failure occurs. The resource is used to carry the first request message, and the first request message may indicate whether a link failure occurs in a cell and/or indicate cells in which the link failure occurs. If the terminal device identifies no new link for the cell in which the link failure occurs, the first request message may indicate that no new link is identified for the cell in which the link failure occurs. If the network device can learn of the cell in which the link failure occurs and/or a new link identification status of the cell in which the link failure occurs, the network device may trigger a new resource set in time based on a status in which no new link is identified for the cell in which the link failure occurs, thereby reducing a link failure recovery delay.

In one embodiment, after the determining the second reference signal resource set based on the response message of the first request message, the method further includes: sending a second request message. The second request message is used to indicate information about K second reference signals for recovering an $i^{th}$ first cell in the M first cells, $1 \le i \le M$, $1 \le K \le N$, and i and K are integers; and/or the second request message is used to indicate information about the first state of a $i^{th}$ first cell in the M first cells, the first state is a state in which there is no second reference signal that is used to recover the $j^{th}$ first cell and that satisfies a second preset threshold, $1 \le j \le M$, and j is an integer.

It should be understood that, there may be one or more of the following cases for content indicated by the second request message:

(1) The terminal device identifies, from the N second reference signals, all new links of the M first cells (which may also be understood as that each of the M first cells has at least one corresponding new link). In this case, the second request message may be used to indicate the information about the K second reference signals for recovering the $i^{th}$ first cell in the M first cells, $1 \le i \le M$, $1 \le K \le N$, i and K are integers, and i may be any one of 1 to M. It should be understood that in this case, values of K that correspond to all the cells may be different.

(2) The terminal device identifies, from the N second reference signals, no new link for any one of the M first cells (which may also be understood as that no corresponding new link is identified for each of the M first cells). In this case, the second request message is used to indicate the information about the first state of the $j^{th}$ first cell in the M first cells, the first state is a state in which there is no second reference signal that is used to recover the $j^{th}$ first cell and that satisfies the second preset threshold, $1 \le j \le M$, j is an integer, and j may be any one of 1 to M.

(3) The terminal device identifies new links of some of the M first cells, and identifies no new link for the other first cells in the M first cells from the N second reference signals (which may also be understood as that new links of some of the M first cells are identified, and new links of the other cells are not identified). In this case, the second request message is used to indicate the information about the K second reference signals for recovering the $i^{th}$ first cell in the M first cells, $1 \le i \le M$, $1 \le K \le N$, and i and K are integers; and the second request message is further used to indicate the information about the first state of the $i^{th}$ first cell in the M first cells, the first state is a state in which there is no second reference signal that is used to recover the $j^{th}$ first cell and that satisfies the second preset threshold, $1 \le j \le M$, and j is an integer. i is not equal to j. That is, the second request message is used to indicate the information about the K second reference signals for recovering the $i^{th}$ first cell in the M first cells and the information about the first state of the $j^{th}$ first cell in the M first cells.

In one embodiment, the terminal device may send the second request information on the uplink resource (PUSCH) indicated by the response information of the first request message.

In one embodiment, channel quality of each of the K second reference signals is greater than or equal to the second preset threshold.

In one embodiment, the second preset threshold herein may be the first preset threshold, namely, the link recovery threshold.

In one embodiment, the method further includes: receiving a response message of the second request message on a third resource based on the information about the K second reference signals.

In one embodiment, the third resource is a resource of the first cell. Specifically, the third resource may be a resource of the SCell. The third resource may be a resource of the $i^{th}$ first cell.

In one embodiment, when a quantity of times that the second request message indicates that the $i^{th}$ first cell in the M first cells is in the first state is greater than or equal to a preset quantity of times, it is determined that link recovery of the $i^{th}$ first cell fails.

Alternatively, when a total quantity of times that the first request message and the second request message indicate that the $i^{th}$ first cell in the M first cells is in the first state is greater than or equal to a preset quantity of times, it is determined that link recovery of the $i^{th}$ first cell fails, where $1 \le i \le M$, and i is an integer.

In other words, when a quantity of times that the first request information and/or the second request information indicate/indicates that the $i^{th}$ first cell in the M first cells is in the first state is equal to the preset quantity of times, and the response information of the second request information is not received, it is determined that the link recovery of the $i^{th}$ first cell fails. Specifically, when a quantity of times that the terminal device reports, for one or more times by using the second request message, that there is no new link (no new beam) reaches the preset quantity of times, but the response information of the second request information is not received, it is determined that the link recovery of the $i^{th}$ first cell fails.

Alternatively, when a quantity of times that the first request information and/or the second request information indicate/indicates that the $i^{th}$ first cell in the M first cells is in the first state is equal to the preset quantity of times, and the response information of the second request information is not received, the second request information of the $i^{th}$ first cell is not sent. Specifically, when a quantity of times that the terminal device reports, for one or more times by using the first request message and/or the second request message, that there is no new link (no new beam) reaches the preset quantity of times, but the response information of the second request information is not received, the second request message not be repeatedly sent, and it is considered by default that the link recovery fails.

In one embodiment, the response message of the first request message is any one of the following: downlink control information DCI in a dedicated search space; DCI in a dedicated control resource set; DCI scrambled by using a dedicated radio network temporary identifier RNTI; or DCI including a preset state value.

According to a second aspect, a link failure recovery method is provided. The link failure recovery method includes: receiving a first request message on a first resource, where the first request message is used to indicate cell information of M first cells in which a link failure occurs, the M first cells are in a first state, the first state is a state in which each of the M first cells has no first reference signal that satisfies a first preset condition, $M \ge 1$, and M is an integer; determining the cell information of the M first cells based on the first request message; and sending a response message of the first request message on a second resource, where the response message of the first request message is used to indicate a second reference signal resource set, the second reference signal resource set includes resources of N second reference signals used to recover the M first cells, N≥1, and N is an integer.

In one embodiment, the cell information of the M first cells includes cell identifiers of the M first cells and/or information about the first state of the M first cells.

In one embodiment, after the sending a response message of the first request message on a second resource, the method further includes: receiving a second request message, where the second request message is used to indicate information about K second reference signals for recovering an $i^{th}$ first cell in the M first cells, 1≤i≤M, 1≤K≤N, and i and K are integers; and/or the second request message is used to indicate information about the first state of a $j^{th}$ first cell in the M first cells, the first state is a state in which there is no second reference signal that is used to recover the $j^{th}$ first cell and that satisfies a second preset threshold, 1≤j≤M, and j is an integer. With reference to the second aspect and the foregoing implementations, In one embodiment, channel quality of each of the K second reference signals is greater than or equal to the second preset threshold.

In one embodiment, the method further includes: sending a response message of the second request message on a third resource based on the information about the K second reference signals.

In one embodiment, when a quantity of times that the second request message indicates that the $i^{th}$ first cell in the M first cells is in the first state is greater than or equal to a preset quantity of times, it is determined that link recovery of the $i^{th}$ first cell fails.

In one embodiment, the response message of the first request message is any one of the following: downlink control information DCI in a dedicated search space; DCI in a dedicated control resource set; DCI scrambled by using a dedicated radio network temporary identifier RNTI; or DCI including a preset state value.

According to a third aspect, a link failure recovery method is provided. The link failure recovery method includes: determining that a link failure occurs in L first cells; and sending a first request message, where the first request message includes first indication information, the first indication information is used to indicate cell information of the L first cells, L≥1, and L is an integer, where the first indication information includes a first part of content and/or a second part of content, the first part of content is used to indicate cell identifiers of the L first cells, and the second part of content is used to indicate whether there is no first reference signal that satisfies a first preset condition.

For example, in this application, a terminal device detects a current link, and determines that a link failure occurs in L SCells. The L SCells include an SCell for which a new link is identified and M SCells for which no new link is identified. In other words, each of the M SCells has no new link. L≥M≥1, and L and M are integers.

Based on the foregoing embodiments, a network device may configure one or more resources for the terminal device. The resource is used to carry the first indication information, and the first indication information may indicate whether a link failure occurs in one or more cells, or indicate a cell identifier of one or more cells in which a link failure occurs, and indicate a new link identification status of each of the one or more cells (whether a new link is identified). The terminal device reports the first indication information to the network device. If the network device can learn of the cell in which the link failure occurs and the new link identification status of the cell, the network device may trigger a new reference signal resource set in time based on the new link identification status of each cell in which the link failure occurs, thereby reducing a link failure recovery delay.

In one embodiment, the second part of content is used to indicate whether each of the L first cells has no first reference signal that satisfies the first preset condition; or the second part of content is used to indicate whether all of the L first cells have no first reference signal that satisfies the first preset condition.

Alternatively, it may be described as follows: The second part of content is used to indicate whether each of the L first cells has a first reference signal that satisfies the first preset condition; or the second part of content is used to indicate whether all of the L first cells have a first reference signal that satisfies the first preset condition; or the second part of content is used to indicate that at least one of the L first cells has a first reference signal that satisfies the first preset condition.

In one embodiment, the method further includes: sending a second request message, where the second request message includes second indication information, and the second indication information is used to indicate information about a reference signal for recovering the L first cells.

Alternatively, the second request message is used to indicate information about a reference signal for recovering the L first cells.

In one embodiment, that the second request message is used to indicate information about a reference signal for recovering the L first cells includes: The second request message is used to indicate information about a first state or a reference signal for recovering each of the L first cells.

It should be understood that, when the second part of content is used to indicate that at least one of the L first cells has a first reference signal that satisfies the first preset condition, the second request message indicates information about the reference signal that satisfies the first preset condition and information about a state in which the first preset condition is not satisfied. It may also be understood that the second request message indicates information about reference signals corresponding to cells for which a new link is identified, and the first state of a cell for which no new link is identified. In one embodiment, the first indication information and the second indication information are independently encoded.

In one embodiment, the first request message and the second request message are a same request message or different request messages. In other words, the first indication information and the second indication information may be sent by using a same link failure request message or different link failure request messages.

It should be understood that, in this embodiment of this application, the first request message and the second request message may be same request information, for example, are collectively referred to as the first request message. In this case, "not sending the second request message" may be understood as "not sending the second indication information"; or may be understood as that the first request message does not include the second indication information; or may be understood as that the first request message includes only the first indication information.

In one embodiment, the first indication information and the second indication information are carried on a same channel, or carried on different channels.

In one embodiment, when the second part of content indicates a first state, the second request message is not sent, and the first state is a state in which each of the L first cells has no first reference signal that satisfies the first preset condition.

It should be understood that, in this implementation, when the second part of content indicates that each of the L first cells in which the link failure occurs has no new link, the terminal device may not generate the second request message or send the second request message, because no new link information needs to be reported to the network device.

It should be further understood that, the second part of content may indicate that some cells are in the first state, and the other cells are in a second state. The corresponding second indication information includes a part of information about the first reference signal and a part of information about the second reference signal.

In one embodiment, when the second part of content indicates the first state of an $i^{th}$ first cell in the L first cells, the second indication information indicates information about a second reference signal for recovering the $i^{th}$ first cell, the first state is a state in which the $i^{th}$ first cell in the L first cells has no first reference signal that satisfies the first preset condition, $1 \le i \le L$, and i is an integer.

In one embodiment, when the second part of content indicates a second state of a $j^{th}$ first cell in the L first cells, the second indication information is used to indicate information about a first reference signal for recovering the $j^{th}$ first cell, the second state is a state in which the $j^{th}$ first cell in the L first cells has a first reference signal that satisfies the first preset condition, $1 \le j \le L$, and j is an integer.

It should be understood that, In one embodiment, based on different states indicated by the second part of content, there may be one or more of the following cases for content indicated by the second request message:

(1) The terminal device identifies no new link for any one of the L first cells. That is, when the second part of content indicates that all of the L first cells are in the first state, the second indication information indicates the information about the second reference signal for recovering the L first cells, the first state is a state in which the $i^{th}$ first cell in the L first cells has no first reference signal that satisfies the first preset condition, $1 \le i \le L$, i is an integer, and i may be any one of 1 to L.

(2) The terminal device identifies a new link of any one of the L first cells. That is, when the second part of content indicates that all of the L first cells are in the second state, the second indication information indicates the information about the first reference signal for recovering the L first cells, the second state is a state in which the $j^{th}$ first cell in the L first cells has a first reference signal that satisfies the first preset condition, $1 \le j \le L$, j is an integer, and j may be any one of 1 to L.

(3) The terminal device identifies new links of some of the M first cells, and identifies no new link for the other first cells in the M first cells from N second reference signals (which may also be understood as that new links of some of the M first cells are identified, and new links of the other cells are not identified). That is, when the second part of content indicates the first state of the $i^{th}$ first cell in the L first cells and the second state of the $j^{th}$ first cell in the L first cells, the second indication information indicates the information about the second reference signal for recovering the $i^{th}$ first cell and the information about the first reference signal for recovering the $j^{th}$ first cell, $1 \le j \le L$, $1 \le i \le L$, i is not equal to j, and i and j are integers.

In one embodiment, a $w^{th}$ reference signal indicated by the second indication information corresponds to a $w^{th}$ cell in the L first cells indicated by the first part of content, $1 \le i \le L$, and w is an integer.

In one embodiment, the method further includes: detecting, based on an $i^{th}$ reference signal indicated by the second indication information, response information of the $i^{th}$ cell in the L first cells indicated by the first part of content, where $1 \le i \le L$, and i is an integer.

It should be understood that, the "first request message" in the third aspect may be different from the "first request message" in the first aspect, and the "second request message" in the third aspect may be different from the "second request message" in the first aspect.

According to a fourth aspect, a link failure recovery method is provided. The link failure recovery method includes: receiving a first request message, where the first request message includes first indication information, the first indication information is used to indicate cell information of L first cells, the L first cells are cells in which a link failure occurs, $L \ge 1$, and L is an integer, where the first indication information includes a first part of content and/or a second part of content, the first part of content is used to indicate cell identifiers of the L first cells, and the second part of content is used to indicate whether there is no first reference signal that satisfies a first preset condition; and determining the cell information of the L first cells based on the first request message.

In one embodiment, the second part of content is used to indicate whether each of the L first cells has no first reference signal that satisfies the first preset condition; or the second part of content is used to indicate whether all of the L first cells have no first reference signal that satisfies the first preset condition.

In one embodiment, the method further includes: sending a second request message, where the second request message includes second indication information, and the second indication information is used to indicate information about a reference signal for recovering the L first cells.

In one embodiment, the first indication information and the second indication information are independently encoded.

In one embodiment, the first indication information and the second indication information are carried on a same channel, or carried on different channels.

In one embodiment, when the second part of content indicates a first state, the second request message is not sent, and the first state is a state in which each of the L first cells has no first reference signal that satisfies the first preset condition.

In one embodiment, when the second part of content indicates a first state of an $i^{th}$ first cell in the L first cells, the second indication information indicates information about a second reference signal for recovering the $i^{th}$ first cell, the first state is a state in which the $i^{th}$ first cell in the L first cells has no first reference signal that satisfies the first preset condition, $1 \le i \le L$, and i is an integer.

In one embodiment, when the second part of content indicates a second state of a $j^{th}$ first cell in the L first cells, the second indication information is used to indicate information about a first reference signal for recovering the $j^{th}$ first cell, the second state is a state in which the $j^{th}$ first cell in the L first cells has a first reference signal that satisfies the first preset condition, $1 \le j \le L$, and j is an integer.

In one embodiment, an $i^{th}$ reference signal indicated by the second indication information corresponds to the $i^{th}$ cell in the L first cells indicated by the first part of content, $1 \le i \le L$, and i is an integer.

It should be understood that, for the solutions described in this application, the "first request message" in the fourth aspect may be different from the "first request message" in the second aspect, and the "second request message" in the fourth aspect may be different from the "second request message" in the second aspect.

According to a fifth aspect, a link failure recovery method is provided. The link failure recovery method includes: determining that M first cells are in a first state, where the first state is a state in which each of the M first cells has no first reference signal that satisfies a first preset condition; sending a first request message on a first resource, where the first request message is used to indicate cell information of the M first cells, M≥1, and M is an integer; and receiving a response message of the first request message, where the response message of the first request message is used to indicate quasi-colocation (quasi-colocation, QCL) assumption information of at least one of the M first cells.

In one embodiment, after the response message of the first request message is received, timing of a link failure recovery clock is stopped.

It should be understood that, the first aspect and the fifth aspect may be combined with the third aspect, that is, the first aspect and the second aspect may be a part of the third aspect.

According to a sixth aspect, a link failure recovery method is provided. The link failure recovery method includes: receiving a first request message on a first resource, where the first request message is used to indicate cell information of M first cells in which a link failure occurs, the M first cells are in a first state, the first state is a state in which each of the M first cells has no first reference signal that satisfies a first preset condition, M≥1, and M is an integer; and sending a response message of the first request message, where the response message of the first request message is used to indicate QCL information of at least one of the M first cells.

In one embodiment, the response message of the first request message is a transmission configuration indicator (transmission configuration indicator, TCI).

It should be understood that, the second aspect and the sixth aspect may be combined with the fourth aspect, that is, the second aspect and the sixth aspect may be a part of the fourth aspect.

According to a seventh aspect, a link failure recovery apparatus is provided. The link failure recovery apparatus includes: a processing unit, configured to determine that M first cells in which a link failure occurs are in a first state, where the first state is a state in which each of the M first cells has no first reference signal that satisfies a first preset condition, M≥1, and M is an integer; and a communications unit, configured to send a first request message on a first resource, where the first request message is used to indicate cell information of the M first cells, where the communications unit is further configured to receive a response message of the first request message on a second resource, where the response message of the first request message is used to indicate a second reference signal resource set, the second reference signal resource set includes resources of N second reference signals used to recover the M first cells, N≥1, and N is an integer; and the processing unit is further configured to determine the second reference signal resource set based on the response message of the first request message.

In one embodiment, the cell information of the M first cells includes cell identifiers of the M first cells and/or information about the first state of the M first cells.

In one embodiment, the communications unit is further configured to send a second request message, where the second request message is used to indicate information about K second reference signals for recovering an $i^{th}$ first cell in the M first cells, 1≤i≤M, 1≤K≤N, and i and K are integers; and/or the second request message is used to indicate information about the first state of a $j^{th}$ first cell in the M first cells, the first state is a state in which there is no second reference signal that is used to recover the $i^{th}$ first cell and that satisfies a second preset threshold, 1≤j≤M, and j is an integer.

In one embodiment, channel quality of each of the K second reference signals is greater than or equal to the second preset threshold.

In one embodiment, the communications unit is further configured to receive a response message of the second request message on a third resource based on the information about the K second reference signals.

In one embodiment, when a quantity of times that the second request message indicates that the $i^{th}$ first cell in the M first cells is in the first state is greater than or equal to a preset quantity of times, it is determined that link recovery of the $i^{th}$ first cell fails, where 1≤i≤M, and i is an integer.

In one embodiment, the response message of the first request message is any one of the following: downlink control information DCI in a dedicated search space; DCI in a dedicated control resource set; DCI scrambled by using a dedicated radio network temporary identifier RNTI; or DCI including a preset state value.

According to an eighth aspect, a link failure recovery apparatus is provided. The link failure recovery apparatus includes: a communications unit, configured to receive a first request message on a first resource, where the first request message is used to indicate cell information of M first cells in which a link failure occurs, the M first cells are in a first state, the first state is a state in which each of the M first cells has no first reference signal that satisfies a first preset condition, M≥1, and M is an integer; and a processing unit, configured to determine the cell information of the M first cells based on the first request message, where the communications unit is further configured to send a response message of the first request message on a second resource, where the response message of the first request message is used to indicate a second reference signal resource set, the second reference signal resource set includes resources of N second reference signals used to recover the M first cells, N≥1, and N is an integer.

In one embodiment, the cell information of the M first cells includes cell identifiers of the M first cells and/or information about the first state of the M first cells.

In one embodiment, the communications unit is further configured to receive a second request message, where the second request message is used to indicate information about K second reference signals for recovering an $i^{th}$ first cell in the M first cells, 1≤i≤M, 1≤K≤N, and i and K are integers; and/or the second request message is used to indicate information about the first state of a $j^{th}$ first cell in the M first cells, the first state is a state in which there is no second reference signal that is used to recover the $i^{th}$ first cell and that satisfies a second preset threshold, 1≤j≤M, and j is an integer.

In one embodiment, channel quality of each of the K second reference signals is greater than or equal to the second preset threshold.

In one embodiment, the communications unit is further configured to send a response message of the second request message on a third resource based on the information about the K second reference signals.

In one embodiment, when a quantity of times that the second request message indicates that the $i^{th}$ first cell in the M first cells is in the first state is greater than or equal to a preset quantity of times, it is determined that link recovery of the $i^{th}$ first cell fails.

In one embodiment, the response message of the first request message is any one of the following: downlink control information DCI in a dedicated search space; DCI in a dedicated control resource set; DCI scrambled by using a dedicated radio network temporary identifier RNTI; or DCI including a preset state value.

According to a ninth aspect, a link failure recovery method is provided. The link failure recovery apparatus includes: determining that a link failure occurs in L cells; and sending a first request message, where the first request message includes first indication information, the first indication information is used to indicate cell information of the L first cells, $L \geq 1$, and L is an integer, where the first indication information includes a first part of content and/or a second part of content, the first part of content is used to indicate cell identifiers of the L first cells, and the second part of content is used to indicate whether there is no first reference signal that satisfies a first preset condition.

In one embodiment, the second part of content is used to indicate whether each of the L first cells has no first reference signal that satisfies the first preset condition; or the second part of content is used to indicate whether all of the L first cells have no first reference signal that satisfies the first preset condition.

In one embodiment, the method further includes: sending a second request message, where the second request message includes second indication information, and the second indication information is used to indicate information about a reference signal for recovering the L first cells.

In one embodiment, the first indication information and the second indication information are independently encoded.

In one embodiment, the first indication information and the second indication information are carried on a same channel, or carried on different channels.

In one embodiment, when the second part of content indicates a first state, the second request message is not sent, and the first state is a state in which each of the L first cells has no first reference signal that satisfies the first preset condition.

In one embodiment, when the second part of content indicates the first state of an $i^{th}$ first cell in the L first cells, the second indication information indicates information about a second reference signal for recovering the $i^{th}$ first cell, the first state is a state in which the $i^{th}$ first cell in the L first cells has no first reference signal that satisfies the first preset condition, $1 \leq i \leq L$, and i is an integer.

In one embodiment, when the second part of content indicates a second state of a $j^{th}$ first cell in the L first cells, the second indication information is used to indicate information about a first reference signal for recovering the $j^{th}$ first cell, the second state is a state in which the $j^{th}$ first cell in the L first cells has a first reference signal that satisfies the first preset condition, $1 \leq j \leq L$, and j is an integer.

In one embodiment, an $i^{th}$ reference signal indicated by the second indication information corresponds to the $i^{th}$ cell in the L first cells indicated by the first part of content, $1 \leq i \leq L$, and i is an integer. It should be understood that, the "first request message" in the ninth aspect may be different from the "first request message" in the seventh aspect, and the "second request message" in the ninth aspect may be different from the "second request message" in the seventh aspect.

According to a tenth aspect, a link failure recovery apparatus is provided. The link failure recovery apparatus includes: a communications unit, configured to receive a first request message, where the first request message includes first indication information, the first indication information is used to indicate cell information of L first cells, the L cells are cells in which a link failure occurs, $L \geq 1$, and L is an integer, where the first indication information includes a first part of content and/or a second part of content, the first part of content is used to indicate cell identifiers of the L first cells, and the second part of content is used to indicate whether there is no first reference signal that satisfies a first preset condition; and a processing unit, configured to determine the cell information of the L first cells based on the first request message.

In one embodiment, the second part of content is used to indicate whether each of the L first cells has no first reference signal that satisfies the first preset condition; or the second part of content is used to indicate whether all of the L first cells have no first reference signal that satisfies the first preset condition.

In one embodiment, the communications unit is further configured to send a second request message, where the second request message includes second indication information, and the second indication information is used to indicate information about a reference signal for recovering the L first cells.

In one embodiment, the first indication information and the second indication information are independently encoded.

In one embodiment, the first indication information and the second indication information are carried on a same channel, or carried on different channels.

In one embodiment, when the second part of content indicates a first state, the communications unit does not send the second request message, and the first state is a state in which each of the L first cells has no first reference signal that satisfies the first preset condition.

In one embodiment, when the second part of content indicates the first state of an $i^{th}$ first cell in the L first cells, the second indication information indicates information about a second reference signal for recovering the $i^{th}$ first cell, the first state is a state in which the $i^{th}$ first cell in the L first cells has no first reference signal that satisfies the first preset condition, $1 \leq i \leq L$, and i is an integer.

In one embodiment, when the second part of content indicates a second state of a $j^{th}$ first cell in the L first cells, the second indication information is used to indicate information about a first reference signal for recovering the $j^{th}$ first cell, the second state is a state in which the $j^{th}$ first cell in the L first cells has a first reference signal that satisfies the first preset condition, $1 \leq j \leq L$, and j is an integer.

In one embodiment, an $i^{th}$ reference signal indicated by the second indication information corresponds to the $i^{th}$ cell in the L first cells indicated by the first part of content, $1 \leq i \leq L$, and i is an integer.

It should be understood that, the "first request message" in the tenth aspect may be different from the "first request message" in the eighth aspect, and the "second request message" in the tenth aspect may be different from the "second request message" in the eighth aspect.

According to an eleventh aspect, a link failure recovery apparatus is provided. The link failure recovery apparatus includes: a processing unit, configured to determine that M first cells are in a first state, where the first state is a state in which each of the M first cells has no first reference signal that satisfies a first preset condition; and a communications unit, configured to send a first request message on a first resource, where the first request message is used to indicate cell information of the M first cells, M≥1, and M is an integer, where the communications unit is further configured to receive a response message of the first request message, where the response message of the first request message is used to indicate quasi-colocation (quasi-colocation, QCL) assumption information of at least one of the M first cells.

In one embodiment, the processing unit is further configured to: after the response message of the first request message is received, stop timing of a link failure recovery clock.

According to a twelfth aspect, a link failure recovery apparatus is provided. The link failure recovery apparatus includes: a communications unit, configured to receive a first request message on a first resource, where the first request message is used to indicate cell information of M first cells in which a link failure occurs, the M first cells are in a first state, the first state is a state in which each of the M first cells has no first reference signal that satisfies a first preset condition, M≥1, and M is an integer; and a processing unit, configured to determine the cell information of the M first cells based on the first request message, where the communications unit is further configured to send a response message of the first request message, where the response message of the first request message is used to indicate QCL information of at least one of the M first cells.

In one embodiment, the response message of the first request message is a transmission configuration indicator (transmission configuration indicator, TCI).

According to a thirteenth aspect, a communications apparatus is provided. The communications apparatus has functions of implementing the terminal device in the method designs in the first aspect, the third aspect, and the fifth aspect. The functions may be implemented by hardware, or may be implemented by hardware by executing corresponding software. The hardware or the software includes one or more units corresponding to the foregoing functions.

According to a fourteenth aspect, a communications apparatus is provided. The communications apparatus has functions of implementing the network device (for example, a base station) in the method designs in the second aspect, the fourth aspect, and the sixth aspect. The functions may be implemented by hardware, or may be implemented by hardware by executing corresponding software. The hardware or the software includes one or more units corresponding to the foregoing functions.

According to a fifteenth aspect, a terminal device is provided. The terminal device includes a transceiver and a processor. In one embodiment, the terminal device further includes a memory. The processor is configured to control the transceiver to send and receive a signal. The memory is configured to store a computer program. The processor is configured to invoke the computer program from the memory and run the computer program, to enable the terminal device to perform the method according to any one of the possible implementations of the first aspect, the third aspect, and the fifth aspect.

According to a sixteenth aspect, a network device is provided. The network device includes a transceiver and a processor. In one embodiment, the network device further includes a memory. The processor is configured to control the transceiver to send and receive a signal. The memory is configured to store a computer program. The processor is configured to invoke the computer program from the memory and run the computer program, to enable the network device to perform the method according to any one of the possible implementations of the second aspect, the fourth aspect, and the sixth aspect.

According to a seventeenth aspect, a communications system is provided. The system includes the terminal devices in the seventh aspect, the ninth aspect, and the eleventh aspect, and the network devices in the eighth aspect, the tenth aspect, and the twelfth aspect; or the system includes the terminal device in the fifteenth aspect and the network device in the sixteenth aspect.

According to an eighteenth aspect, a communications apparatus is provided. The communications apparatus may be the terminal device in the foregoing method designs, or may be a chip disposed in the terminal device. The communications apparatus includes a processor that is coupled to a memory and may be configured to execute instructions in the memory, to implement the method performed by the terminal device in any one of the possible implementations of the first aspect, the third aspect, and the fifth aspect. In one embodiment, the communications apparatus further includes the memory. In one embodiment, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

In one embodiment, the transceiver may be a transceiver circuit. In one embodiment, the input/output interface may be an input/output circuit.

According to a nineteenth aspect, a communications apparatus is provided. The communications apparatus may be the network device in the foregoing method designs, or may be a chip disposed in the network device. The communications apparatus includes a processor that is coupled to a memory and may be configured to execute instructions in the memory, to implement the method performed by the network device in any one of the possible implementations of the second aspect, the fourth aspect, and the sixth aspect. In one embodiment, the communications apparatus further includes the memory. In one embodiment, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

In one embodiment, the transceiver may be a transceiver circuit. In one embodiment, the input/output interface may be an input/output circuit.

According to a twentieth aspect, a computer program product is provided. The computer program product includes computer program code, and when the computer program code is run on a computer, the computer is enabled to perform the methods according to the foregoing aspects.

According to a twenty-first aspect, a computer-readable medium is provided. The computer-readable medium stores program code, and when the computer program code is run on a computer, the computer is enabled to perform the methods according to the foregoing aspects.

DESCRIPTION OF EMBODIMENTS

Figure 1:
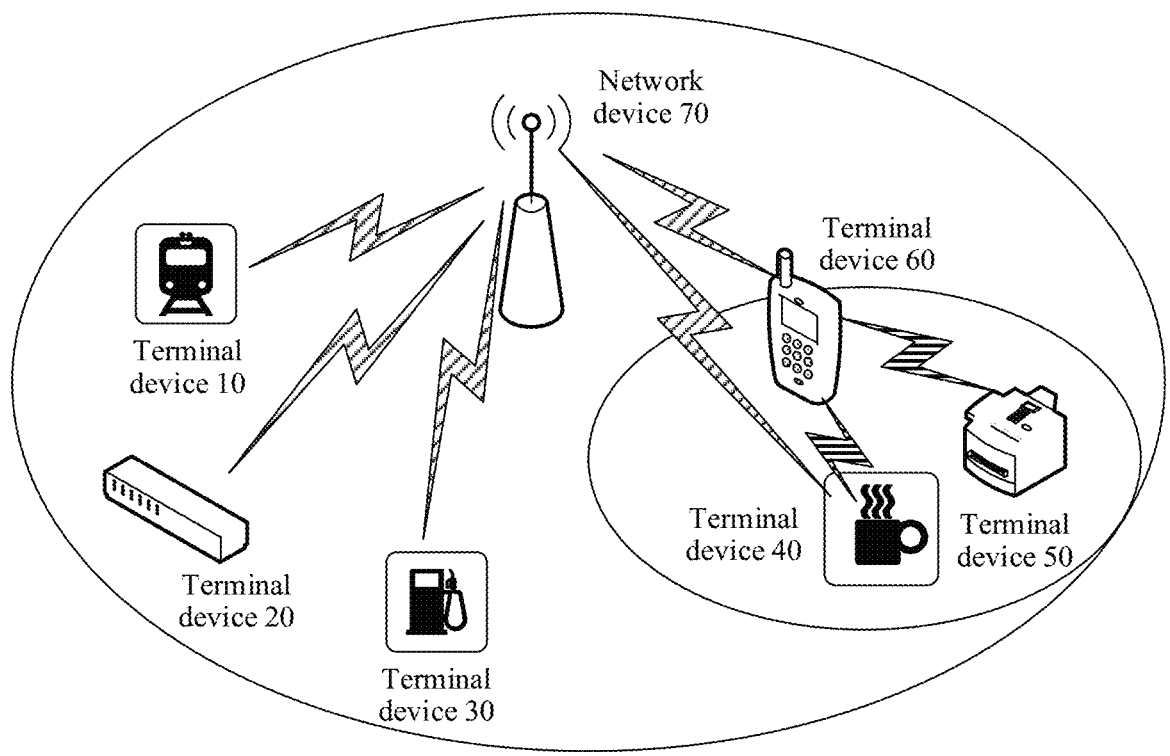
FIG. 1 is a schematic architectural diagram of a mobile communications system to which an embodiment of this application is applicable.

The following describes the technical solutions in this application with reference to the accompanying drawings.

The technical solutions in the embodiments of this application may be applied to various communications systems, for example, a long term evolution (LTE) system, an LTE frequency division duplex (FDD) system, an LTE time division duplex (TDD) system, and a fifth generation (5G) mobile communications system or a new radio (NR) communications system. For example, the 5G mobile communications system includes a non-standalone (NSA) 5G mobile communications system and/or a standalone (SA) 5G mobile communications system. The technical solutions in the embodiments of this application may be further applied to a future mobile communications system and the like, for example, a sixth generation mobile communications system.

A terminal device in the embodiments of this application may be user equipment (UE), an access terminal device, a subscriber unit, a subscriber station, a mobile station, a remote station, a remote terminal device, a mobile device, a user terminal device, a terminal device, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" may cover a computer program that is accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

FIG. 1 is a schematic architectural diagram of a mobile communications system to which an embodiment of this application is applicable. The communications system in FIG. 1 may include at least one terminal device (for example, a terminal device 10, a terminal device 20, a terminal device 30, a terminal device 40, a terminal device 50, and a terminal device 60) and a network device 70. The network device 70 is configured to provide a communication service for the terminal device and enable the terminal device to access a core network. The terminal device may access a network by searching for a synchronization signal, a broadcast signal, or the like sent by the network device 70, to communicate with the network. The terminal device 10, the terminal device 20, the terminal device 30, the terminal device 40, and the terminal device 60 in FIG. 1 may perform uplink and downlink transmission with the network device 70. For example, the network device 70 may send downlink signals to the terminal device 10, the terminal device 20, the terminal device 30, the terminal device 40, and the terminal device 60, or may receive uplink signals sent by the terminal device 10, the terminal device 20, the terminal device 30, the terminal device 40, and the terminal device 60.

In addition, the terminal device 40, the terminal device 50, and the terminal device 60 may also be considered as a communications system. The terminal device 60 may send downlink signals to the terminal device 40 and the terminal device 50, or may receive uplink signals sent by the terminal device 40 and the terminal device 50.

It should be noted that the embodiments of this application may be applied to a communications system including one or more network devices, or may be applied to a communications system including one or more terminal devices. This is not limited in this application.

To facilitate understanding of this application, the following describes terms related to this application.

1. Control Resource Set (CORESET)

To improve efficiency of blindly detecting a control channel by a terminal device, the concept of control resource set is proposed in an NR standard formulation process. A network device may configure one or more resource sets for the terminal device, to send a physical downlink control channel (PDCCH). The network device may send a control channel to the terminal device on any control resource set corresponding to the terminal device. In addition, the network device further needs to notify the terminal device of another configuration, for example, a search space set, associated with the control resource set. Configuration information of all control resource sets varies. For example, frequency-domain widths vary, or time-domain lengths vary. It is extensible that the control resource set in this application may be a CORESET, a control region, or an enhanced physical downlink control channel (ePDCCH) set that is defined in a 5G mobile communications system.

A time-frequency position occupied by the PDCCH may be referred to as a downlink control region. In LTE, the PDCCH is always located on the first m (where possible values of m are 1, 2, 3, and 4) symbols of a subframe. It should be noted that an E-PDCCH and an R-PDCCH in LTE are not located on the first m symbols.

In NR, the downlink control region may be flexibly configured in the control resource set (CORESET) and the search space set (search space set) by using RRC signaling.

Information such as a frequency domain position of the PDCCH or a control channel element (CCE) and a quantity (where a maximum value is 3) of continuous time-domain symbols may be configured in the control resource set.

Information such as a PDCCH detection periodicity, an offset, and a start symbol in a slot may be configured in the search space set.

For example, if it may be configured in the search space set that a PDCCH periodicity is one slot and a start symbol in time domain is a symbol 0, the terminal device may detect the PDCCH at a start position of each slot.

2. Quasi-Colocation (QCL) Assumption Information

Quasi co-site/quasi-colocation QCL assumption information may also be referred to as QCL information. The QCL information is used to assist in describing receiving beamforming information by the terminal device and a receiving procedure.

The QCL information is used to indicate a QCL relationship between two types of reference signals. A target reference signal may be usually a demodulation reference signal (DMRS), a channel state information reference signal (CSI-RS), or the like. A referenced reference signal or a source reference signal may be usually a CSI-RS, a tracking reference signal (TRS), a synchronization signal/physical broadcast channel block (synchronous signal/PBCH block, SSB), a sounding reference signal (SRS), or the like.

It should be understood that spatial characteristic parameters of two reference signals or channels that satisfy a QCL relationship are the same, so that a spatial characteristic parameter of the target reference signal can be inferred based on a resource index of the source reference signal.

It should be further understood that spatial characteristic parameters of two reference signals or channels that satisfy spatial relation information are the same, so that the spatial characteristic parameter of the target reference signal can be inferred based on the resource index of the source reference signal.

The spatial characteristic parameter includes one or more of the following parameters:

an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmit beamforming of the terminal device, receive beamforming of the terminal device, spatial channel correlation, transmit beamforming of the network device, receive beamforming of the network device, an average channel gain, an average channel delay (average delay), a delay spread, a Doppler spread, a Doppler shift, a spatial reception parameter (spatial Rx parameters), or the like.

These spatial characteristic parameters describe a characteristic of a spatial channel between an antenna port for the source reference signal and an antenna port for the target reference signal, and help the terminal device complete receive-side beamforming or a receiving processing process based on the QCL information. It should be understood that, the terminal device may receive the target reference signal based on information about a receive beam for the source reference signal indicated by the QCL information. These spatial characteristic parameters further help the terminal device complete transmit-side beamforming or a transmission processing process based on the spatial relation information. It should be understood that the terminal device may transmit the target reference signal based on information about a transmit beam for the source reference signal indicated by the spatial correlation information.

To reduce overheads of indicating the QCL information by the network device for the terminal device, in an optional implementation, the network device may indicate that a demodulation reference signal of the PDCCH or a physical downlink shared channel (PDSCH) and one or more of a plurality of reference signal resources previously reported by the terminal device satisfy a QCL relationship. For example, the reference signal may be a CSI-RS. Herein, an index of each reported CSI-RS resource corresponds to one transmit-receive beam pair previously established during measurement performed based on the CSI-RS resource. It should be understood that information about receive beams for the two reference signals or channels that satisfy the QCL relationship is the same, and the terminal device may infer, based on the indexes of the reference signal resources, information about receive beams for receiving the PDCCH or the PDSCH.

Four types of QCL are defined in an existing standard, and the network device may simultaneously configure one or more types of QCL for the terminal device, for example, QCL types A+D, and QCL types C+D:

QCL types A: Doppler shift, Doppler spread, average delay, delay spread

QCL types B: Doppler shift, Doppler spread

QCL types C: average delay, Doppler shift

QCL types D: Spatial Rx parameter

In an example of this application, correspondences of some parameters may also be used in descriptions of a QCL scenario.

It should be understood that in a scenario applicable to QCL assumption in this application, there may alternatively be an association relationship between two reference signals, or may further be an association relationship between transmission objects.

It should be understood that, in this application, there is a similar concept for uplink signal sending, for example, spatial relation information. The spatial relation information is used to assist in describing transmit-side beamforming information and a transmission procedure of the terminal device.

The spatial relation information is used to indicate a spatial transmit parameter relationship between two types of reference signals. The target reference signal may be usually a DMRS, an SRS, or the like, and the referenced reference signal or the source reference signal may be usually a CSI-RS, an SRS, an SSB, or the like.

3. Transmission Configuration Indicator (TCI) State

A TCI is used to indicate QCL information of a PDCCH/CORESET or a PDSCH. TCI information indicates that a reference signal included in a TCI and a DMRS of the PDCCH/PDSCH satisfy a QCL relationship, and is mainly used to indicate that during reception of the PDCCH/PDSCH, information such as a spatial reception parameter of the PDCCH/PDSCH is the same as, similar to, or approximate to information such as a spatial reception parameter of the reference signal included in the TCI.

One TCI state may include one or two referenced reference signals and an associated QCL type. The QCL type may further be classified into four categories: A, B, C, and D that are different combinations or selections of {Doppler shift, Doppler spread, average delay, delay spread, spatial Rx parameter}. The TCI state includes QCL information, or the TCI state is used to indicate QCL information.

4. Synchronization Signal/Physical Broadcast Channel Block (Synchronous Signal/PBCH Block, SS/PBCH Block)

An SS/PBCH block may also be referred to as an SSB. PBCH is an abbreviation of a physical broadcast channel. The SSB includes at least one of a primary synchronization signal (PSS), a secondary synchronization signal (SSS), and a PBCH. The SSB is a signal mainly used for cell searching, cell synchronization, and carrying broadcast information.

5. Concepts Related to Cells and Carriers:

Carrier Aggregation (CA):

A plurality of consecutive or non-consecutive component carriers are aggregated into a larger bandwidth (for example, up to 100 MHz), thereby satisfying a bandwidth requirement of the 3GPP.

Component Carrier (CC):

Each carrier in multi-carrier aggregation may be referred to as a "CC". Each carrier includes one or more physical resource blocks (PRBs). There may be a corresponding physical downlink control channel (PDCCH) on each carrier, and the PDCCH is used to schedule a physical downlink control channel (PDSCH) on the respective CC. Alternatively, there may be no PDCCH, but the PDSCH is scheduled by using a PDCCH on another CC. When the terminal device may receive data on a plurality of CCs, the CCs may also be referred to as component carriers, component carriers, component carriers, or the like.

Primary Cell (PCell):

A PCell is a cell on which a CA terminal device camps. The CA terminal device corresponds to a physical uplink control channel (physical uplink control channel, PUCCH). Generally, only the PCell has a PUCCH.

Primary Secondary Cell (PSCell):

A PSCell is a special secondary cell that is of a secondary eNodeB (SeNB) and that is configured by a master eNodeB (MeNB) for DC UE by using RRC connection signaling.

Secondary Cell (SCell):

An SCell is a cell configured for the CA terminal device by using RRC connection signaling, works on an SCC (secondary component carrier), and may provide more radio resources for the CA terminal device. In the SCell, there can be downlink transmission only or both downlink and uplink transmission.

Special Cell (Special Cell, SPCell):

In a dual connectivity (DC) scenario, an SPCell is a PCell in a master cell group (MCG) or a PSCell in a secondary cell group (SCG). Otherwise, in a CA scenario, the SPCell is a PCell.

MCG/SCG:

MCG: A group to which cells that provide services for the terminal device and that are served by a master eNodeB belong is a master cell group. In a dual connectivity mode, a group of serving cells associated with the MeNB includes a PCell and one or more SCells.

SCG: A group to which cells that provide services for the UE and that are served by a secondary eNodeB belong is a secondary cell group. In the dual connectivity mode, a PSCell and zero or more SCells are included.

MeNB/SeNB:

An MeNB is a base station that serves a cell on which the DC terminal device camps.

An SeNB is another base station configured by the MeNB for the DC UE by using RRC connection signaling.

6. Beam:

A beam is a communication resource. The beam may be a wide beam, a narrow beam, or another type of beam. A beamforming technology may be a beamforming technology or another technical means. The beamforming technology may be specifically a digital beamforming technology, an analog beamforming technology, or a hybrid digital/analog beamforming technology. Different beams may be considered as different resources. Same information or different information may be sent on different beams. In one embodiment, a plurality of beams having a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It may be understood that the one or more antenna ports forming the beam may alternatively be considered as one antenna port set.

Beams may be classified into a transmit beam and a receive beam of the network device, and a transmit beam and a receive beam of the terminal device. The transmit beam of the network device is used to describe transmit-side beamforming information of the network device, and the receive beam of the base station is used to describe receive-side beamforming information of the network device. The transmit beam of the terminal device is used to describe transmit-side beamforming information of the terminal device, and the receive beam of the terminal is used to describe receive-side beamforming information of the terminal device. In other words, the beam is used to describe beamforming information.

The beam may correspond to a time resource, and/or a space resource, and/or a frequency domain resource.

In one embodiment, the beam may further correspond to a reference signal resource (for example, a reference signal resource for beamforming) or beamforming information.

In one embodiment, the beam may further correspond to information associated with a reference signal resource of the network device. A reference signal may be a channel state information reference signal (CSI-RS), an SSB, a demodulation reference signal (DMRS), a phase tracking signal (PTRS), a tracking signal (TRS), or the like. The information associated with the reference signal resource may be a reference signal resource identifier, QCL information (especially the QCL type D), or the like. The reference signal resource identifier corresponds to a transmit-receive beam pair that is previously established during measurement based on the reference signal resource. The terminal may infer beam information based on the reference signal resource index.

In one embodiment, the beam may further correspond to a spatial domain filter (spatial filter or spatial domain filter), or a spatial domain transmission filter.

Different types of reference signals are generally used in a communications system, where one type of reference signal is used to estimate a channel, to perform coherent demodulation on a received signal including control information or data, and another type of reference signal is used for measurement of a channel state or channel quality, to implement scheduling on the terminal device. The terminal device obtains channel state information (CSI) through measurement based on channel quality of a CSI-RS. The CSI includes at least one of a rank indicator (RI), a precoding matrix indicator (precoding matrix indicator, PMI), a channel quality indicator (CQI), or the like. The CSI information may be sent by the terminal device to a base station through a physical uplink control channel or a physical uplink shared channel.

With emergence of intelligent terminals, especially emergence of video services, current spectrum resources can hardly match an explosive growth of user requirements on a capacity. A high frequency band with a larger available bandwidth, especially a millimeter-wave band, gradually becomes a candidate frequency band of a next generation communications system. In addition, in a modern communications system, a multi-antenna technology is usually used to increase a capacity and coverage of the system, or improve user experience. Another advantage of using the high frequency band is that a size of a multi-antenna configuration can be greatly reduced, to facilitate site obtaining and deployment of more antennas. However, a difference from an operating frequency band in an existing system such as an LTE system lies in that, the high frequency band causes a larger path loss, and especially, a loss in radio propagation further becomes larger due to factors such as atmosphere and vegetation.

To overcome the larger propagation loss, a signal transmission mechanism that is based on a beamforming technology is applied, with the intention of using a relatively high antenna gain to compensate for the loss in a signal propagation process. Beamforming signals may include a broadcast signal, a synchronization signal, a cell-specific reference signal, and the like.

When a signal is transmitted based on the beamforming technology, once a user moves, a direction of a beamformed beam corresponding to the transmitted signal may not match a position of the user after the movement, and interruption to receiving of the signal may occur frequently. To track changes of the beamformed beam in the signal transmission process, channel quality measurement and result reporting based on the beamforming technology are introduced. The channel quality measurement may be based on a beamformed synchronization signal or cell-specific reference signal. The user performs handover between different beamformed beams more dynamically and frequently than handover between cells. Therefore, a dynamic measurement and reporting mechanism is required. In one embodiment, similar to CSI information reporting, reporting of a channel quality result of the beamformed beam may also be sent by the terminal device to the base station through a physical uplink control channel or a physical uplink shared channel.

After measuring a plurality of beams sent by the base station, the terminal device selects N better beams of the base station, and reports measurement information of the N better beams to the base station. The beam measurement information is beam state information (BSI), and content thereof mainly includes a beam index and reference signal received power (RSRP) of a beam. In a beam training process, the network device measures a plurality of beams sent by the terminal device, and notifies the terminal device of a better beam in the plurality of beams sent by the terminal device, for example, notifies the terminal device by using a reference signal resource, for example, a beam index 1. The receive beam of the terminal device is indicated by using a spatial RX parameter in the QCL, and the beam state information may be described as L1-RSRP related information.

Specifically, the beam training process includes the following operations.

(1) Select N best beam pairs (BPLs) (one BPL includes one transmit beam of the base station and one receive beam of the terminal device, or one BPL includes one transmit beam of the terminal device and one receive beam of the base station). The terminal device selects the transmit beam of the base station and/or the receive beam of the terminal based on beam sweeping performed by the network device, and the network device selects a transmit beam of the terminal and/or a receive beam of the base station based on beam sweeping performed by the terminal device.

(2) Update a transmit beam. The transmit beam may be a transmit beam of the base station, or may be a transmit beam of the terminal device. When the transmit beam is the transmit beam of the base station, the base station sends reference signals to the terminal device by using different transmit beams, and the terminal device receives, by using a same receive beam, the reference signals that are sent by the base station by using the different transmit beams, determines a best transmit beam of the base station based on the received signals, and then feeds back the best transmit beam of the base station to the base station, so that the base station updates the transmit beam. When the transmit beam is the transmit beam of the terminal, the terminal device sends reference signals to the base station by using different transmit beams, and the base station receives, by using a same receive beam, the reference signals that are sent by the terminal device by using the different transmit beams, determines a best transmit beam of the terminal device based on the received signals, and then feeds back the best transmit beam of the terminal device to the terminal device, so that the terminal device updates the transmit beam. The process of sending the reference signals by using different transmit beams may be referred to as beam sweeping, and the process of determining the best transmit beam based on the received signals may be referred to as beam matching.

(3) Update a receive beam. The receive beam may be a receive beam of the base station, or may be a receive beam of the terminal device. When the receive beam is the receive beam of the base station, the terminal device sends reference signals to the base station by using a same transmit beam, and the base station receives, by using different receive beams, the reference signals sent by the terminal device, and then determines a best receive beam of the base station based on the received signals, to update the receive beam of the base station. When the receive beam is the receive beam of the terminal device, the base station sends reference signals to the terminal device by using a same transmit beam, and the terminal device receives, by using different receive beams, the reference signals sent by the base station, and then determines a best receive beam of the terminal device based on the received signals, to update the receive beam of the terminal device.

During downlink signal transmission, both the transmit beam of the base station and the receive beam of the terminal device may dynamically change, and there may be a plurality of best receive beams determined by the terminal device based on the received signals. To enable the terminal device to determine a receive beam of the terminal device, the terminal device may feed back information about the plurality of receive beams to the network device, and the network device may indicate the receive beam of the terminal to the terminal device by sending beam indication information to the terminal device. When the terminal device uses analog beamforming, the terminal device may precisely determine the receive beam of the terminal based on the beam indication information sent by the network device. Therefore, beam sweeping time of the terminal device can be shortened, and power is saved.

In the beam training process described above, the base station obtains N better beam pairs BPLs for communication with the terminal device, where the beam pairs BPLs are <Bx, B'x> and <By, B'y>, where Bx represents a transmit beam of the base station, B'x represents a receive beam of the terminal device, By represents a transmit beam of the terminal device, and B'y represents a receive beam of the base station. In a subsequent process of communication with the terminal device, the base station uses the N BPLs for data transmission. However, because of blocking in a communication process and a poor diffraction capability in a high frequency channel, a current serving beam is blocked, and a signal cannot be further transmitted. To prevent sudden communication interruption caused by beam blocking, a corresponding mechanism needs to be introduced to detect beam quality and quickly recover a link when the beam is blocked.

7. Reference Signal Configured for Link Failure Detection and Link Failure Recovery To detect and recover a link fault, the network device may configure, for the terminal device, a reference signal resource set (for example, a beam failure detection RS resourceconfig, a beam failure detection RS, or failure detection resources) (which may also be referred to as a link failure detection reference signal resource set) used for beam failure detection. The network device may further configure, for the terminal device, a reference signal resource set (a candidate beam RS list, a candidate beam RS identification resource, a beam failure candidate beam resource, a candidate beam identification RS, or a candidate beam list) (which may also be referred to as a candidate reference signal resource set or a link failure recovery reference signal resource set) used to recover a link between the terminal device and the network device. In addition, a reference signal used to detect the link failure may alternatively be implicitly indicated, and a reference signal associated with a TCI indicating a PDCCH is used as the reference signal for detecting the link failure. The reference signal is a reference signal that satisfies a QCL relationship with a DMRS on the PDCCH and that is periodically sent. An RS in a beam failure detection RS set and the demodulation reference signal on the physical downlink control channel PDCCH satisfy the QCL relationship or use a same TCI state as the PDCCH. When channel quality information (for example, reference signal received power (RSRP), a channel quality indicator (CQI), a block error rate (BLER), a signal to interference plus noise ratio (SINR), and a signal-to-noise ratio (SNR)) of some or all reference signals in the set is less than a predetermined threshold, it is determined that a communications link is faulty. Being less than the predetermined threshold may be being less than the predetermined threshold for W consecutive times or being less than the predetermined threshold for W times in a time period. In one embodiment, the predetermined threshold may be the same as a radio link failure out-of-synchronization (radio link failure OOS (out of sync)) threshold. The predetermined threshold may be referred to as a link failure detection threshold, or may be referred to as a link failure threshold. It should be understood that, any threshold used for link failure detection may be the predetermined threshold, and a name of the predetermined threshold is not limited in the present disclosure.

After a beam failure, the terminal device needs to select, from the candidate reference signal resource set, a reference signal resource whose channel quality information (such as RSRP or a CQI) is greater than the predetermined threshold, to recover the communications link. In one embodiment, the predetermined threshold may be configured by the network device. Herein, a beam failure detection RS is used by the terminal to detect channel quality of a transmit beam of the network device, and the transmit beam is a beam used when the network device communicates with the terminal. A candidate beam identification RS is a reference signal set used by the terminal device to initiate link reconfiguration after the terminal device determines that a communications link fault occurs on the transmit beam of the network device.

It should be understood that, in the embodiments of this application, a communication failure may also be referred to as a communications link failure, a communications link fault, a link fault, a link failure, a communication fault, a beam failure, a beam fault, or the like. In the embodiments of this application, these concepts have a same meaning. The communication failure may mean that signal quality of a reference signal used for PDCCH beam failure detection is less than or equal to a preset threshold. After the communications link is faulty, the terminal device needs to select, from a candidate reference signal resource set, a reference signal resource whose channel quality information (such as RSRP, RSRQ, a CQI, or an SINR) is greater than the predetermined threshold, to recover the communications link.

In one embodiment, the predetermined threshold may be configured by the network device, or may be a predefined threshold. For example, when the network device does not configure the threshold, a threshold used for mobility measurement is used by default. The predetermined threshold may be referred to as a link failure recovery threshold, or may be referred to as a link recovery threshold. It should be understood that, any threshold used for link failure recovery may be the predetermined threshold, and a name of the predetermined threshold is not limited in the present disclosure. The candidate beam identification RS is a reference signal set used by the terminal device to initiate link reconfiguration after the terminal device determines that the communications link fault occurs on the transmit beam of the network device.

In the embodiments of this application, communication failure recovery may also be referred to as recovery of communication between the network device and the terminal device, communication fault recovery, link failure recovery, link fault recovery, beam failure recovery, beam fault recovery, communications link failure recovery, communications link fault recovery, link reconfiguration, or the like.

During specific implementation, the two sets, namely, the reference signal resource set used for beam failure detection and the reference signal resource set used to recover the link between the terminal device and the network device may alternatively have other names. This is not specifically limited in this application.

In the embodiments of this application, communication failure recovery request information may also be referred to as communication fault recovery request information, link failure recovery request information, link fault recovery request information, beam failure recovery request information, beam fault recovery request information, communications link failure recovery request information, communications link fault recovery request information, link reconfiguration request information, reconfiguration request information, or the like. It should be understood that, in the embodiments of this application, the communication failure recovery request information may be referred to as a first request message, a second request message, and/or a third request message.

In the embodiments of this application, communication failure recovery response information may also be referred to as communication failure response information, beam failure recovery response information, beam failure response information, communications link fault recovery response information, communications link fault response information, communications link failure recovery response information, communications link failure response information, beam fault recovery response information, beam fault response information, link reconfiguration response information, link fault recovery response information, link fault response information, link failure recovery response information, link failure response information, communication fault recovery response information, communication fault response information, reconfiguration response information, or the like. It should be understood that, in this application, the communication failure recovery response information may be referred to as response information for short.

In the embodiments of this application, In one embodiment, a communication failure recovery request may mean sending a signal on a resource used to carry the communication failure recovery request. The communication failure recovery response information may mean receiving, on a control resource set and/or a search space set that are/is used to send a communication failure recovery response, downlink control information (DCI) whose cyclic redundancy check (CRC) is scrambled by using a cell radio network temporary identifier (C-RNTI). The communication failure recovery response information may alternatively be DCI scrambled by using other information (for example, DCI scrambled by using a BFR-RNTI). The communication failure recovery response information may alternatively be data scheduled by using the DCI. The communication failure recovery response information may alternatively be an ACK of the data scheduled by using the DCI. The communication failure recovery response information may alternatively be one of the following information: DCI scrambled by using the cell radio network temporary identifier C-RNTI, DCI scrambled by using a modulation and coding scheme cell radio network temporary identifier MCS-C-RNTI, downlink control information DCI in a dedicated search space, DCI scrambled by using a dedicated radio network temporary identifier RNTI, DCI scrambled by using a random access radio network temporary identifier RA-RNTI, DCI including a preset state value, DCI including transmission configuration indicator TCI information, quasi-colocation QCL indication information of a cell in which a link failure occurs, or DCI in a preset format, where the DCI in the preset format indicates newly transmitted data. This is not limited in the embodiments of this application.

It should be understood that, in the embodiments of this application, the communication failure, the communication failure recovery, the communication failure recovery request information, and the communication failure recovery response information may alternatively have other names. This is not specifically limited in this application.

It should be understood that, in this application, a link recovery failure of a cell may be understood as that the terminal device no longer sends first request information, second request information, and/or third request information that correspond/corresponds to the cell; may be understood as stopping timing of a link failure recovery clock; or may be understood as stopping counting of a link failure recovery counter, or the like. Alternatively, a link recovery failure of a cell may be understood as that no response information of the cell is received yet when a link failure recovery clock corresponding to the cell expires and/or counting of a link failure recovery counter exceeds a maximum quantity of times or reaches the maximum quantity of times. The link failure recovery counter is used to count a quantity of times that the link failure recovery request information is sent. In one embodiment, a media access control (MAC) layer of the terminal device maintains a link failure recovery timer (beam failure recovery timer) and a link failure recovery counter (beam failure recovery counter). The link failure recovery timer is used to control an entire time length of link failure recovery. The link failure recovery counter is used to limit a quantity of times that the terminal device sends a link failure recovery request. When the link failure recovery counter reaches a maximum value, the terminal device considers that the link failure recovery fails, and stops a link failure recovery process. A time length of recovery of the recovery timer and a count value of the recovery counter may be configured by the network device, or may be preset values.

It should be understood that, in this application, a link recovery success of a cell may be understood as that the terminal device detects response information of the cell.

It should be understood that "detection" in the embodiments of this application may be understood as "receiving", or may be understood as "decoding".

It should be understood that, in this application, a time unit may be one or more radio frames, one or more subframes, one or more slots, one or more mini-slots, one or more orthogonal frequency division multiplexing (OFDM) symbols, or the like defined in an LTE system or a 5G NR system, or may be a time window including a plurality of frames or subframes, for example, a system information (SI) window.

It should be understood that, "occurrence of a link failure" may be replaced with "a link failure" in the embodiments of this application.

It should be understood that, in the embodiments of this application, "information about a first state" may be replaced with the "first state", or "information about the first state" and the "first state" are equivalent concepts.

It should be understood that, in the embodiments of this application, the "preset threshold" may be replaced with the "predetermined threshold", or the "preset threshold" and the "predetermined threshold" are equivalent concepts.

It should be understood that, in this application, a "first reference signal" is a corresponding reference signal in a first reference signal resource set, and the first reference signal resource set may be a candidate reference signal set. The first reference signal resource set is a reference signal resource set used to recover a link of a first cell. The corresponding reference signal in the first reference signal resource set may be a reference signal of the first cell, or may be a reference signal of another cell. In other words, the corresponding reference signal resource in the first reference signal resource set may be a reference signal resource of the first cell, or may be a reference signal resource of another cell. This is not limited in the embodiments of this application.

It should be understood that, in the embodiments of this application, interaction between the terminal device and the network device is generally corresponding. To be specific, the terminal device sends information, and correspondingly, the network device also receives the information. Alternatively, the network device sends information, and correspondingly, the terminal device also receives the information. Further, physical resources used by the network device and the terminal device to send and receive information or rules, for example, periodicities or priority sequences applied by the network device and the terminal device to send and receive the information are also corresponding. This is not limited in the embodiments of this application.

It should be understood that, for definitions of the foregoing terms, refer to the conventional technology. However, with continuous development of technologies, the foregoing definitions may also change. This is not limited in the embodiments of this application.

Figure 2:
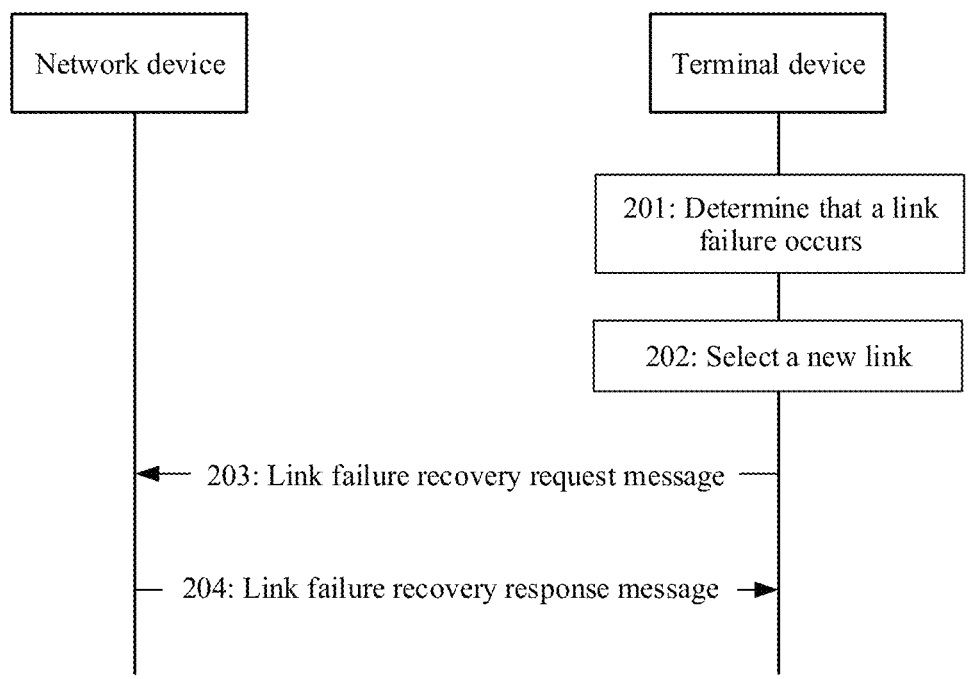
FIG. 2 is a schematic flowchart of a link failure recovery method.

FIG. 2 is a schematic flowchart of a link failure recovery method. As shown in FIG. 2, the link failure recovery method 200 includes the following content.

201: A terminal device detects a working state of a current link. For example, the terminal device may detect the current link, and determine that the current link fails.

It should be understood that a link in this application may be understood as a "beam". That is, the terminal fails to transmit a signal by using a current beam.

For example, when the terminal device determines that channel quality information of a beam failure detection RS or channel quality information of all or some reference signals in a beam failure detection RS set is less than or equal to a link failure detection threshold for N consecutive times, the terminal device may determine that a link between the terminal device and a network device is faulty.

It should be understood that, in this embodiment of this application, a manner in which the terminal device determines that the link between the terminal device and the network device fails is not limited to the foregoing example, and that the link between the terminal device and the network device fails may alternatively be determined in another determining manner. This is not limited in this application.

202: The terminal device selects a new link, that is, the terminal device selects a new beam.

For example, the terminal device measures channel quality information of a candidate reference signal set (candidate beam identification RS), and determines, based on the channel quality information of the candidate beam identification RS, a reference signal (new identified beam) whose channel quality is greater than or equal to a second preset threshold, that is, determines a new beam.

203: After selecting the new link, the terminal device sends a link failure request message (BFRQ) to the network device, and correspondingly, the network device receives the BFRQ sent by the terminal device.

The BFRQ includes the new link selected by the terminal device in operation 202. In other words, the BFRQ may indicate information about a reference signal that is identified by the terminal device and whose channel quality information is greater than a link failure recovery threshold. The terminal device may explicitly or implicitly notify the network device of information about the new identified link (for example, the new beam) or a new identified reference signal resource.

Correspondingly, after receiving the BFRQ sent by the terminal device, the network device determines the new link based on the information about the new link that is included in the BFRQ.

It should be understood that, in a process in which the terminal device sends the BFRQ to the network device, a media access control (MAC) layer of the terminal device maintains a timer (beam failure recovery timer) and a counter (beam failure recovery counter). The timer (beam failure recovery timer) is used to control an entire time length of link failure recovery. The counter (beam failure recovery counter) is used to limit a quantity of times that the terminal device sends a link failure recovery request. When the timer expires or the counter reaches a maximum value, the terminal device considers that the link failure recovery fails, and stops a link failure recovery process.

204: The network device sends a beam failure recovery response message (beam failure recovery response, BFRR) to the terminal device, and correspondingly, the terminal device receives the BFRR sent by the network device.

The BFRR may be sent based on the information about the new link or the information about the reference signal that is indicated in 203.

The terminal device detects DCI in a CORESET sent by the network device, where the CORESET may be a dedicated CORESET resource configured by the network device for the terminal device, and is used for: during a link failure, after the terminal device sends a link failure request BFRQ, a downlink control resource of a link failure response message BFRR sent by the network device to the terminal device.

The terminal device receives the BFRR based on the information about the new link that is included in the BFRQ. If the terminal device receives the link failure recovery response information, the terminal device determines that the link failure recovery succeeds.

It should be understood that, in the link failure recovery method 200, operation 201 may be performed earlier than operation 202, or operation 201 and operation 202 may be performed simultaneously. A time sequence of performing operation 201 and operation 202 is not limited in this application.

It should be further understood that, in the link failure recovery method 200, operation 202 may be performed earlier than operation 203, or operation 202 may be performed later than operation 203, or operation 202 and operation 203 may be performed simultaneously. A time sequence of performing operation 202 and operation 203 is not limited in this application.

In the foregoing descriptions, when determining the link failure, the terminal device may identify the information about the new link or information about the new beam, and may notify the network device of the information about the new link, to perform link recovery. However, if the terminal device cannot determine a new link or cannot find an available new link in operation 202, in other words, the terminal device cannot find a reference signal or a new beam (new identified beam) whose channel quality is greater than or equal to the second preset threshold, the link failure recovery fails. Consequently, link communication is interrupted, and communication efficiency is reduced.

To improve link recovery reliability, this application provides a link recovery method. When the terminal device cannot determine a new link or cannot find an available new link, the terminal device may indicate, to the network device in an explicit or implicit manner, that no new link is identified, and then perform link recovery in another manner, thereby increasing a link failure recovery probability and improving the link recovery reliability.

Figure 3:
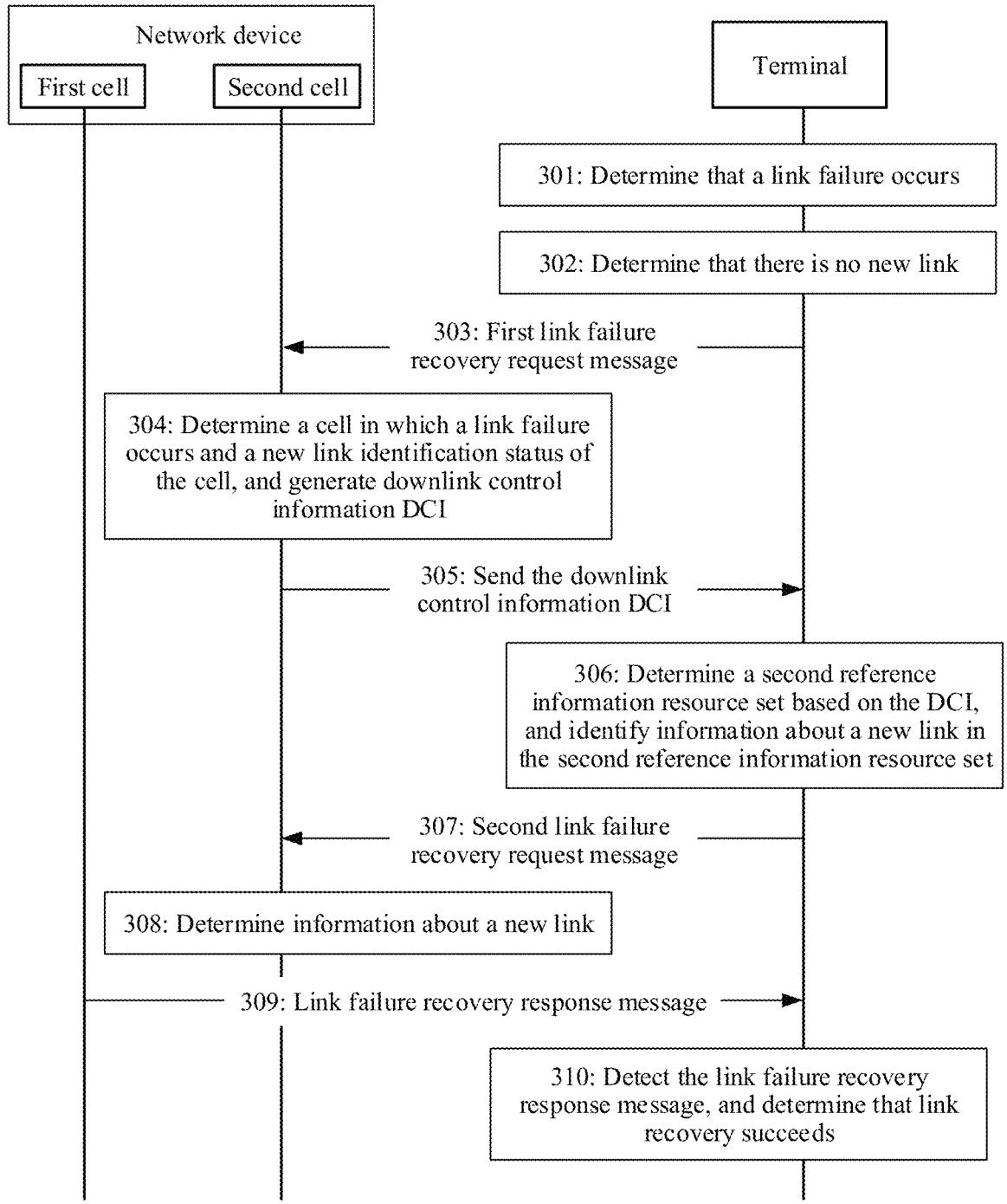
FIG. 3 is a schematic flowchart of an example of a link failure recovery method according to an embodiment of this application.

FIG. 3 is a schematic flowchart of an example of a link failure recovery method according to an embodiment of this application.

It should be understood that, in descriptions of this embodiment of this application, a network device may provide one PCell and at least one SCell for a terminal device. An example in which a link between the SCell and the terminal device fails is used, and each operation of the method 300 is described in detail by using the terminal device and the network device as execution bodies.

By way of example, and not limitation, the method 300 may alternatively be performed by a chip used in the terminal device and a chip used in the network device. This is not limited in this application.

301: The terminal device detects a working state of a current link. For example, the terminal device may detect the current link, and determine that the current link fails.

It should be understood that, for operation 301, refer to operation 201 in the method 200. Specifically, when the terminal device determines that channel quality information of a beam failure detection RS or channel quality information of all or some reference signals in a beam failure detection RS set is less than or equal to a first preset threshold for N consecutive times, the terminal device may determine that a link between the terminal device and the network device is faulty.

It should be further understood that, in this embodiment of this application, a manner in which the terminal device determines that the link between the terminal device and the network device fails is not limited to the foregoing example, and that the link between the terminal device and the network device fails may alternatively be determined in another determining manner. This is not limited in this application.

302: The terminal device determines that there is no new link.

For example, in this application, the terminal device detects the current link, and determines that a link failure occurs in L SCells. No new link is identified for M SCells. In other words, each of the M SCells has no new link. L≥M≥1, and L and M are integers.

It should be understood that, that the terminal device determines that there is no new link is that there is no new available beam or no first reference signal corresponding to the beam, which is referred to as a no new beam state in this application, namely, a first state in this application. It may be understood that, the first state is a state in which each of the M first cells has no first reference signal that satisfies a first preset condition, and the first preset condition is used to determine that no new link is identified for the M SCells.

In another embodiment, the terminal device may determine, in one or more of the following manners, that there is no new link:

(1) The terminal device determines that no candidate beam list is configured, and a link recovery threshold is configured.

It should be understood that, the link recovery threshold herein may be a preset threshold. Value relationships between the preset threshold and the first preset threshold and between the preset threshold and a second preset threshold, and a channel quality type are not limited in this application. In one embodiment, the link recovery threshold may be equal to the second preset threshold or the first preset threshold.

It should be further understood that, the preset threshold (for example, the first preset threshold, the second preset threshold, or the link recovery threshold) in this application may be preconfigured or predefined in a protocol. A configuration manner of the preset threshold is not limited in this application.

(2) The terminal device determines that a candidate beam list is configured, and no link recovery threshold is configured.

(3) The terminal device determines that a candidate beam list and a link recovery threshold are configured, but the terminal device identifies, from the candidate beam list, no reference signal greater than the link recovery threshold.

(4) The terminal device determines that neither a candidate beam list nor a link recovery threshold is configured. In this case, it may be considered by default that there is no new link.

303: The terminal device sends a first request message to the network device, and correspondingly, the network device receives the first request message sent by the terminal device, where the first request message indicates cell information of a cell in which a link failure occurs.

In one embodiment, the first request message may be a first link failure request message, scheduling request information, or a combination of the two. This is not limited in this application.

In a possible implementation, the first indication information includes a first part of content and/or a second part of content, the first part of content is used to indicate an identifier of one or more cells in which a link failure occurs, and the second part of content is used to indicate whether a new link is identified for each cell in which the link failure occurs.

It should be understood that, in this implementation, operation 302 is an optional operation.

For example, it is assumed that the network device provides Q SCells for the terminal device (In one embodiment, the Q SCells are SCells that require link failure detection, that is, the network device configures the Q SCells that require link failure detection). The terminal device determines that a link failure occurs in three SCells, and the terminal device reports identifiers (IDs) of the three SCells in which the link failure occurs to the network device. As shown in the following Table 1, the identifiers of the three SCells in which the link failure occurs are respectively C1, C2, and C3. The first part of content may include the identifiers of the three cells in which the link failure occurs, and the second part of content may include information indicating whether a new link is identified for each of the three cells. For example, for C1 and C3, no new link is identified, and for C2, a new link is identified. In one embodiment, the second part of content may be indicated by using indication information of several bits (bits). For example, "000" indicates that no new link is identified for the cell whose identifier is C1, and "001" indicates that a new link is identified for the cell whose identifier is C1. Content of the first indication information is not limited in this application.

TABLE 1

| SCell identifier (first part of content) | Whether a new link is identified (second part of content) |
|---|---|
| C1 | No |
| C2 | Yes |
| C3 | No |

It should be understood that, in the foregoing implementation, the first part of content may indicate an identifier of one or more cells in which a link failure occurs, and a maximum value of a quantity of cells in which a link failure occurs and that are indicated by the first part of content may be configured by the network device, or may be reported by the terminal device, or may be reported by a terminal device capability, or may be predefined in a protocol.

It should be understood that, in the foregoing implementation, the first indication information may have a plurality of forms. The following describes in detail the first indication information in some possible cases, and describes possible resource configuration manners of the first part of content and the second part of content in this implementation by cases.

Case 1

The first part of content and the second part of content are carried on one resource. The resource may be a PRACH resource (contention-based or non-contention-based), a PUCCH resource, a semi-persistent PUSCH resource, or the like.

Hybrid mapping (or referred to as hybrid encoding) may be performed on the first part of content and the second part of content. It may be understood that a first part of content of a first cell follows a second part of content of the first cell. For example, the network device provides, for the terminal device, four SCells (for example, C1, C2, C3, and C4) that require link failure recovery detection. The terminal device determines that a link failure occurs in three SCells (for example, C1, C2, and C3), and the terminal device reports, to the network device, binary state values (for example, 00, 01, and 10) corresponding to identifiers of the three SCells in which the link failure occurs. The identifiers of the three SCells in which the link failure occurs are respectively C1, C2, and C3. The first part of content may include the identifiers of the three cells in which the link failure occurs, and the second part of content may include information indicating whether a new link is identified for each of the three cells. For example, for C1 and C3, no new link is identified, and for C2, a new link is identified. For example, "0" indicates that no new link is identified, and "1" indicates that a new link is identified. The content of the first indication information is not limited in this application. Details are shown in the following Table 2.

TABLE 2

| SCell identifier (first part of content) | Whether a new link is identified (second part of content) |
|---|---|
| 00 | 0 |
| 01 | 1 |
| 10 | 0 |

The content of the first indication information may be 000011100. The first three bits indicate a first part of content (cell identifier) and a second part of content (state information indicating whether a new link is identified) of the 1st cell in which a link failure occurs. The middle three bits indicate a first part of content and a second part of content of the $2^{nd}$ cell in which a link failure occurs. Similarly, a same method is used for the following three bits.

The first part of content and the second part of content may be mapped separately. It may be understood that, first parts of content of all first cells in which a link failure occurs follow second parts of content of all the first cells in which the link failure occurs. For example, the network device provides, for the terminal device, four SCells (for example, C1, C2, C3, and C4) that require link failure recovery detection. The terminal device determines that a link failure occurs in three SCells (for example, C1, C2, and C3), and the terminal device reports, to the network device, binary state values (for example, 00, 01, and 10) corresponding to identifiers of the three SCells in which the link failure occurs. The identifiers of the three SCells in which the link failure occurs are respectively C1, C2, and C3. The first part of content may include the identifiers of the three cells in which the link failure occurs, and the second part of content may include information indicating whether a new link is identified for each of the three cells. For example, for C1 and C3, no new link is identified, and for C2, a new link is identified. For example, "0" indicates that no new link is identified, and "1" indicates that a new link is identified. The content of the first indication information is not limited in this application. As shown in Table 2, the content of the first indication information may be 000110010. The first six bits indicate a first part of content of the Pt cell in which a link failure occurs, a first part of content of the $2^{nd}$ cell in which a link failure occurs, and a first part of content of the $3^{rd}$ cell in which a link failure occurs. The last three bits indicate a second part of content, where in the three bits, the first bit corresponds to a second part of content of the $1^{st}$ cell in which the link failure occurs, the second bit corresponds to a second part of content of the $2^{nd}$ cell in which the link failure occurs, and the third bit corresponds to a second part of content of the $3^{rd}$ cell in which the link failure occurs.

The first part of content and the second part of content are carried on one resource, so that the network device can more quickly obtain the information about the cell in which the link failure occurs.

It should be understood that, in the case 1, the first part of content and the second part of content may be jointly encoded.

Case 2

The first part of content and the second part of content are carried on different resources, and/or the first part of content and the second part of content are independently encoded. The resource may be a PRACH resource (contention-based or non-contention-based), a PUCCH resource, a semi-persistent PUSCH resource, or the like.

Example 1

The network device configures P1 first resources used to carry the first part of content, and P2 second resources used to carry the second part of content, where P1≥1, 1≤P2≤P1, and P1 and P2 are integers. The terminal device may implicitly report, based on an association relationship between resources or between a resource and a cell, an identifier of a cell in which a link failure occurs and/or a status of whether a new link is identified for the cell in which the link failure occurs. For example, the P1 first resources may be associated with Q first cells. Further, P1=Q, and one of the P1 first resources may be associated with one of the Q first cells. The P2 second resources may be associated with the Q first cells. Further, P2=Q, and one of the P2 second resources may be associated with one of the Q first cells. The P2 second resources may be further associated with the P1 first resources.

It should be understood that, indication information of a first part of content sent by the terminal device on the one or more first resources is used to indicate that a link failure occurs in one or more cells corresponding to the one or more first resources. After determining whether a new link is identified for the one or more cells, the terminal device sends, on the second resource corresponding to the one or more cells, indication information of a second part of content that indicates whether a new link is identified.

The terminal device determines that a link failure occurs in L first cells in the Q first cells, and the terminal device selects, at least one resource from the P1 first resources to send a first part of content, where the first part of content indicates cell identifiers or cell group identifiers of the L first cells in which the link failure occurs. For example, if there is a one-to-one correspondence between the P1 first resources and the Q first cells, the terminal device selects L first resources that are in the P1 first resources and that have a correspondence or association relationship with the L first cells in which the link failure occurs, to send the first part of content (used to indicate that the link failure occurs in the L first cells corresponding to the P1 first resources). The terminal device may select at least one resource from the P2 second resources to send a second part of content, where the second part of content indicates information indicating whether a new link is identified for each of the L first cells in which the link failure occurs. For example, if there is a one-to-one correspondence between the P2 second resources and the Q first cells, the terminal device selects L second resources that are in the P2 second resources and that have a correspondence or association relationship with the L first cells in which the link failure occurs, to send the second part of content. For another example, if there is a one-to-one correspondence between the P2 second resources and L first resources (the association relationship is dynamic, because the L first resources are dynamically selected, for example, it is stipulated in a protocol that the P2 resources may be sequentially associated with the L first resources for reporting the first part of content by the terminal device), the terminal device selects L second resources that are in the P2 second resources and that have a correspondence or association relationship with the L first cells in which the link failure occurs, to send the second part of content. For example, the network device configures five first resources corresponding to cells #1, #2, #3, #4, and #5, and two second resources. The terminal determines that a link failure occurs in the cells #1 and #5, reports a first part of content on the first resource #1 and the first resource #5, reports a new link identification status of the cell #1 on the second resource #1, and reports a new link identification status of the cell #5 on the second resource #2.

Example 2

The network device configures one first resource used to carry the first part of content, and one second resource used to carry the second part of content. The terminal device may report, in an explicit manner, an identifier of a first cell in which a link failure occurs and/or a new link identification status of the cell in which the link failure occurs. The terminal device sends the first part of content on the first resource, and sends the second part of content on the second resource.

Example 3

The network device configures one first resource used to carry the first part of content, and a plurality of second resources used to carry the second part of content. The terminal device may report, in an explicit manner, an identifier of a first cell in which a link failure occurs, and/or report, in an implicit manner, a new link identification status of the cell in which the link failure occurs. The terminal device sends the first part of content on the first resource, and selects at least one resource from the plurality of second resources to send the second part of content. A method for reporting the cell identifier in the implicit manner is the same as that in the example 1, and details are not described herein again.

Example 4

The network device configures a plurality of first resources used to carry the first part of content, and one second resource used to carry the second part of content. The terminal device may report, in an implicit manner, an identifier of a first cell in which a link failure occurs, and/or report, in an explicit manner, a new link identification status of the cell in which the link failure occurs. The terminal device selects at least one resource from the plurality of first resources to send the first part of content, and sends the second part of content on the second resource. A method for reporting the second part of content in the implicit manner is the same as that in the example 1, and details are not described herein again.

The first part of content and the second part of content are carried on different resources, so that the network device can independently decode the two parts of content, and resource configuration or encoding of the two parts of content is more flexible. In this way, a higher decoding success rate can be obtained. In addition, if the quantity of cells in which a link failure occurs and that are indicated by the first part of content changes, a total quantity of bits that need to be reported to indicate whether a new link is identified for each cell in which the link failure occurs also changes accordingly, that is, a quantity of bits of the second part of content also changes. Therefore, if the first part of content and the second part of content are carried on different resources or independently encoded, the network device may not allocate a fixed-size resource based on a maximum quantity of bits, thereby reducing resource overheads.

It should be understood that, in the case 2, the first resource and the second resource may be a same resource; in this case, the first part of content and the second part of content are independently encoded. The first resource and the second resource may alternatively be different resources.

Based on the foregoing implementation, the network device may configure one or more resources for the terminal device. The resource is used to carry the first indication information, and the first indication information may indicate whether a link failure occurs in one or more cells, or indicate a cell identifier of one or more cells in which a link failure occurs, and indicate a new link identification status of each of the one or more cells (whether a new link is identified). The terminal device reports the first indication information to the network device. If the network device can learn of the cell in which the link failure occurs and the new link identification status of the cell, the network device may trigger a new reference signal resource set in time based on the new link identification status of each cell in which the link failure occurs, thereby reducing a link failure recovery delay. In addition, when a link failure occurs in a plurality of cells, link recovery can be simultaneously performed according to the method, thereby reducing a link failure recovery delay.

In a possible implementation, the first indication information includes a first part of content and a second part of content, the first part of content is used to indicate an identifier of one cell in which a link failure occurs, and the second part of content is used to indicate whether a new link is identified for the cell.

It should be understood that, in this implementation, operation 302 is an optional operation.

Correspondingly, the network device may decode or parse the first part of content and the second part of content according to the method. That is, the second part of content is decoded or parsed based on the first part of content.

In one embodiment, the second part of content indicates a new link identification status (whether a new link is identified) corresponding to the cell in which the link failure occurs and that is indicated by the first part of content. Specifically, it is assumed that the network device configures Q SCells (In one embodiment, the Q SCells are SCells that require link failure detection, that is, the network device configures the Q SCells that require link failure detection). The terminal device determines that a link failure occurs in one or more SCells. The terminal device reports an identifier of one of three SCells in which the link failure occurs to the network device, and reports a new link identification status (information indicating whether a new link is identified) of the SCell to the network device.

It should be understood that, in the foregoing implementation, the first indication information may have a plurality of forms. The following describes in detail the first indication information in some possible cases, and describes possible resource configuration manners of the first part of content and the second part of content in this implementation. In one embodiment, the first part of content and the second part of content are carried on different resources, and/or the first part of content and the second part of content are independently encoded. The resource may be a PRACH resource (contention-based or non-contention-based), a PUCCH resource, a semi-persistent PUSCH resource, or the like.

Example 5

The network device configures a plurality of first resources used to carry the first part of content, and one second resource used to carry the second part of content. The terminal device may report, in an implicit manner, an identifier of one first cell in which a link failure occurs, and/or report a new link identification status of the first cell in which the link failure occurs. The terminal device selects one resource from the plurality of first resources to send the first part of content (that is, the identifier of the first cell in which the link failure occurs), and sends, on the second resource, the new link identification status (that is, the second part of content) of the first cell indicated by the first part of content. More specifically, the network device may configure P1 first resources used to carry the first part of content, and one second resource used to carry the second part of content, where P1≥1, and P1 is an integer. The terminal device may implicitly report, based on an association relationship between resources or between a resource and a cell, an identifier of one cell in which a link failure occurs, and report, based on the identifier of the cell in which the link failure occurs and that is indicated by the first part of content, a status of whether a new link is identified for the cell in which the link failure occurs. For example, the P1 first resources may be associated with Q first cells. Further, P1=Q, and one of the P1 first resources may be associated with one of the Q first cells (it may also be understood that each of the Q first cells is associated with one first resource). For example, the network device configures five first resources corresponding to cells #1, #2, #3, #4, and #5, and one second resource. The terminal determines that a link failure occurs in the cell #2, reports a first part of content on the first resource #2, and reports a new link identification status of the cell #2 on the second resource.

For example, for a cell C1 in which a link failure occurs, the first part of content carried on the first resource is used to indicate an identifier C1 of the cell, and the second part of content carried on the second resource is used to indicate that no new link is identified for C1. Similarly, for a cell C2 in which a link failure occurs, the network device also configures one first resource for C2. The first part of content carried on the first resource is used to indicate an identifier C2 of the cell, and the second part of content carried on the second resource is used to indicate that a new link is identified for C2.

Example 6

The network device configures one first resource used to carry the first part of content, and one second resource used to carry the second part of content. The terminal device may report, in an explicit manner, an identifier (that is, the first part of content) of one first cell in which a link failure occurs, and report a new link identification status (that is, the second part of content) of the first cell in which the link failure occurs. The terminal device sends the first part of content on the first resource, and sends the second part of content on the second resource.

It should be understood that, in the foregoing implementation, the first resource and the second resource may be a same resource; in this case, the first part of content and the second part of content are independently encoded, and each occupy different bits. The first resource and the second resource may alternatively be different resources.

Based on the foregoing implementation, the network device may configure one or more resources for the terminal device, where the resource is used to carry the first indication information. The first indication information indicates an identifier of a cell in which a link failure occurs, and information indicating whether a new link is identified for the cell in which the link failure occurs. The terminal device reports the first indication information to the network device on a corresponding resource. If the network device can learn of the cell in which the link failure occurs and a new link identification status of the cell, the network device may trigger a new resource set in time based on the new link identification status of the cell in which the link failure occurs, thereby reducing a link failure recovery delay. In addition, the network device may configure one or more resources used to indicate the identifier of the cell in which the link failure occurs, and configure another resource used to indicate the new link identification status of the cell in which the link failure occurs. Alternatively, the terminal device may report, by using some bits, the identifier of the cell in which the link failure occurs, and then report, by using another bit, the new link identification status of the cell in which the link failure occurs. It may also be understood that the terminal device determines the second part of content based on the reported first part of content. The method can effectively reduce resource overheads.

In addition, when a link failure occurs in one cell, link recovery may be separately performed for the cell according to the method.

In a possible implementation, the first indication information includes a first part of content and a second part of content, the first part of content is used to indicate identifiers of a plurality of cells in which a link failure occurs, and the second part of content is used to indicate whether no new link is identified for all of the plurality of cells in which the link failure occurs.

It should be understood that, in this implementation, operation 302 is an optional operation.

That the second part of content is used to indicate whether no new link is identified for all of the plurality of cells in which the link failure occurs may be understood as that the first state is reported when no new link is identified for all of the plurality of cells in which the link failure occurs and that are indicated in the first part of content, and a second state is reported when at least one new link is identified for the plurality of cells in which the link failure occurs and that are indicated in the first part of content.

It should be understood that, herein, the first state is a state in which each of the M first cells has no first reference signal that satisfies the first preset condition, and the second state is a state in which a $j^{th}$ first cell in the M first cells has a first reference signal that satisfies the first preset condition, or the second state is a state in which at least one of the M first cells has a first reference signal that satisfies the first preset condition.

It should be further understood that, in this embodiment of this application, the first state and the second state in the second part of content may be indicated in the following three manners.

Manner 1: Two state values are used. For example, a state value 0 indicates the first state, and a state value 1 indicates the second state.

Manner 2: Two resources are used. For example, a signal is sent on one second resource to indicate the first state, and a signal is sent on another second resource to indicate the second state.

Manner 3: The two states are represented by sending or not sending a signal on one second resource. For example, the first state is represented by not sending a signal on the second resource, and the second state is represented by sending a signal on the second resource.

It should be understood that, in this embodiment of this application, there are a scenario in which the second part of content is sent and a scenario in which the second part of content is not sent, and the foregoing three manners are all possible implementations, and should not affect the solutions in this application.

In addition, the first state in the first indication information/the first request message, or a first state in second indication information/a second request message may be further indicated in a method 4.

Method 4: The first state is indicated by using a special state value. As shown in the following Table 3, the indication information includes two bits used to indicate information about a reference signal, and a minimum state value (which may be a 00 state) of the two bits indicates the first state.

TABLE 3

| Value (reference signal information) | Indicated reference signal |
| --- | --- |
| 00 | No beam (no new link) |
| 01 | Reference signal #1 |
| 10 | Reference signal #2 |
| 11 | Reference signal #3 |

Specifically, it is assumed that the network device provides Q SCells for the terminal device. The terminal device determines that a link failure occurs in three SCells, and the terminal device reports identifiers (identifications, IDs) of the three SCells in which the link failure occurs to the network device. As shown in the following Table 4, the identifiers of the three SCells in which the link failure occurs are respectively C1, C2, and C3. The first part of content may include the identifiers of the three cells in which the link failure occurs, and the second part of content may include information indicating whether no new link is identified for all of the three cells. For example, no new link is identified for all of C1, C2, and C3. Therefore, the second part of content is yes, and is used to notify the network device that no new link is identified for all of the three SCells in which the link failure occurs.

TABLE 4

| SCell identifier (first part of content) | Whether no new link is identified (second part of content) |
| --- | --- |
| C1 | Yes |
| C2 | |
| C3 | |

It should be understood that, in the foregoing implementation, the first indication information may have a plurality of forms. The following describes in detail the first indication information in some possible cases, and describes possible resource configuration manners of the first part of content and the second part of content in this implementation by cases.

Example 7

The network device configures a plurality of first resources used to carry the first part of content, and one second resource used to carry the second part of content. The terminal device may report, in an implicit manner, identifiers of a plurality of first cells in which a link failure occurs, and/or report a status of whether no corresponding new link is identified for all of the plurality of first cells in which the link failure occurs. The terminal device selects at least two resources from the plurality of first resources to send the first part of content (that is, the identifiers of the plurality of first cells in which the link failure occurs), and sends, on the second resource, the status of whether no new link is identified for all of the plurality of first cells indicated by the first part of content (that is, the second part of content).

More specifically, the network device may configure P1 first resources used to carry the first part of content, and one second resource used to carry the second part of content, where P1≥1, and P1 is an integer. The terminal device may implicitly report, based on an association relationship between resources or between a resource and a cell, identifiers of a plurality of cells in which a link failure occurs, and report, based on the identifiers of the plurality of cells in which the link failure occurs and that are indicated by the first part of content, a status of whether no new link is identified for all of the plurality of cells in which the link failure occurs. For example, the P1 first resources may be associated with Q first cells. Further, P1=Q, and one of the P1 first resources may be associated with one of the Q first cells (it may also be understood that each of the Q first cells is associated with one first resource). For example, the network device configures five first resources corresponding to cells #1, #2, #3, #4, and #5, and one second resource. The terminal determines that a link failure occurs in the cell #2 and the cell #5, reports a first part of content on the first resource #2 and the first resource #5, and reports new link identification statuses of the cell #2 and the cell #5 on the second resource (for example, if a new link of the cell #2 and a new link of the cell #5 are not identified, the state value 0 is reported on the second resource; or if at least one of a new link of the cell #2 and a new link of the cell #5 is identified, the state value 1 is reported on the second resource).

Example 8

The network device configures one first resource used to carry the first part of content, and one second resource used to carry the second part of content. The terminal device may report, in an explicit manner, identifiers (that is, the first part of content) of a plurality of first cells in which a link failure occurs, and report a status of whether no new link is identified for all of the plurality of first cells in which the link failure occurs (that is, the second part of content). The terminal device sends the first part of content on the first resource, and sends the second part of content on the second resource. For example, the network device configures one first resource (where the resource may carry information of a plurality of bits) and one second resource. The terminal determines that a link failure occurs in a cell #2 and a cell #5, reports an identifier of the cell #2 and an identifier of the cell #5 (that is, the first part of content) on the first resource, and reports new link identification statuses of the cell #2 and the cell #5 on the second resource. For example, a total of 16 cells (cells #1 to 16) require link failure detection, and 0001 and 0100 are reported on the first resource, where 0001 indicates a cell #2, and 0100 indicates a cell #5. If a new link of the cell #2 and a new link of the cell #5 are not identified, the state value 0 is reported on the second resource; or if at least one of a new link of the cell #2 and a new link of the cell #5 is identified, the state value 1 is reported on the second resource.

It should be understood that, in the foregoing implementation, the first resource and the second resource may be a same resource; in this case, the first part of content and the second part of content are independently encoded, and each occupy different bits. The first resource and the second resource may alternatively be different resources.

It should be understood that in the example 5 and the example 7, the network device configures a corresponding first resource for each SCell, where the first resource is used to carry the first part of content (that is, indicating an identifier of one or more cells in which a link failure occurs), and configures one second resource to indicate whether no new link is identified for all of the one or more cells in which the link failure occurs. The terminal device may send the first part of content on one or more first resources, to indicate that a link failure occurs in one or more cells corresponding to the resource. After determining whether no new link is identified for all of the one or more cells, the terminal device sends the second part of content on the second resource, or determines whether to send a signal on the second resource configured by the network device.

It should be understood that in the example 6 and the example 8, the network device configures one first resource, where the first resource is used to carry the first part of content (that is, indicating an identifier of one or more cells in which a link failure occurs), and configures one second resource to indicate whether no new link is identified for all of the one or more cells in which the link failure occurs. The terminal device may send the first part of content on one or more first resources, to indicate that a link failure occurs in one or more cells corresponding to the resource. After the terminal device determines whether no new link is identified for all of the one or more cells, the terminal device sends the second part of content on the second resource, or determines whether to send a signal on the second resource configured by the network device.

Based on the foregoing implementation, the network device may configure one or more resources for the terminal device, where the resource is used to carry the first part of content, the first part of content may indicate an identifier of a cell in which a link failure occurs; and configure one second resource for the cell in which the link failure occurs, where the second resource is used to carry the second part of content, and the second part of content may indicate whether no new link is identified for the cell in which the link failure occurs. In addition, the first indication information including the first part of content and the second part of content is reported to the network device. If the network device can learn of a plurality of cells in which a link failure occurs and a general new link identification status of the plurality of cells, the network device may trigger a new resource set in time based on the general new link identification status of the plurality of cells in which the link failure occurs, thereby reducing a link failure recovery delay.

In addition, compared with the foregoing technical solution of configuring one second resource for each SCell, in this implementation, one second resource is configured for a plurality of SCells in which a link failure occurs, and indication information indicating whether no new link is identified for all of the SCells in which the link failure occurs is reported, thereby reducing resource overheads. In other words, because a plurality of cells in which a link failure occurs share one second resource for indicating the second part of content, or because a plurality of cells in which a link failure occurs share one bit for indicating the second part of content, resource overheads can be effectively reduced.

In one embodiment, the first resource and the second resource may be physical uplink control channels (PUCCHs). In other words, the first request message may be sent to the network device through a PUCCH. This is not limited in this application.

In one embodiment, it should be understood that information reported in the explicit manner in the example 1 to the example 8 is generally sent through a PUCCH channel or a PUSCH channel that may carry information of a plurality of bits. In one embodiment, it should be understood that information reported in the implicit manner in the example 1 to the example 8 is generally carried and sent through a PRACH channel, a PUCCH channel, or some sequences that may carry information of one bit (better reliability can be obtained and transmission accuracy can be improved), or may be sent by using different time domain/frequency domain/code domain resources of a PRACH/PUCCH/PUSCH.

304: The network device determines, based on the first request information or the first indication information, the cell in which the link failure occurs and/or the new link identification status of the cell in which the link failure occurs, and generates downlink control information (downlink control information, DCI).

In other words, the network device determines, based on the first request information, the cell in which the link failure occurs and/or the new link identification status of the cell in which the link failure occurs, and generates a response message of the first request message.

In other words, the network device generates the response message of the first request message based on the first request information.

It should be understood that, the response message of the first request message may be the downlink control information.

In one embodiment, the response message of the first request message may be used to indicate a PUSCH resource.

In one embodiment, the first request message indicates the first state, and the DCI is used to indicate a second reference signal resource set.

Specifically, the terminal device determines that there is no new link, and reports the identifier of the first cell in which the link failure occurs to the network device. The network device may reconfigure another reference signal resource set for the terminal device, that is, reconfigure the second reference signal resource set for the terminal device by using the DCI.

In one embodiment, the second reference signal resource set may include a periodic reference signal, an aperiodic reference signal, or a semi-periodic reference signal. This is not limited in this application.

It should be understood that, the "second reference signal resource set" in this application may include a reference signal resource of the first cell, or may include only a reference signal resource of another cell, or may include a reference signal of the first cell and a reference signal resource of the another cell (in other words, the second reference signal resource set may include reference signal resources of a plurality of cells). This is not limited in this embodiment of this application.

It should be understood that, in this application, the second reference signal resource set may be one resource set, or may be a plurality of reference signal resource sets.

In one embodiment, if the first indication information indicates the first state, the DCI indicates the second reference signal resource set, or the DCI is associated with the second reference signal resource set by default. If the first indication information indicates the second state, the DCI is associated with a first reference signal resource set by default. In one embodiment, the terminal device sends the second request message on a resource indicated by the DCI.

In one embodiment, the second reference signal resource set may not include a candidate beam list (candidate beam list). In operation 302, when a candidate beam list is configured, the terminal device has detected a reference signal in the candidate beam list, and determines that no new link is identified. Therefore, the second reference signal resource set does not include a resource in the candidate beam list, so that the terminal device can be prevented from performing detection again, thereby reducing a link recovery delay.

In one embodiment, the DCI is sent on a resource in a search space set (beam failure recovery search space, BFR search space) and/or a control resource set (CORESET) used to send a communication failure recovery response.

In the foregoing solution, in a process of sending the DCI, the DCI is sent in the search space set and/or the control resource set used by the network device to send the BFRR, and a link recovery process may be continued through a retransmission operation, thereby improving link recovery reliability.

In one embodiment, the DCI is scrambled by using a link failure recovery request-radio network temporary identifier (beam failure recovery-radio network temporary identifier, BFR-RNTI).

In the foregoing solution, the DCI sent by the network device to the terminal device is scrambled by using the BFR-RNTI. After receiving the scrambled DCI, the terminal device may determine, based on the scrambled information, that the DCI is used in the link recovery process, so that a detection process of the terminal device is simplified, thereby reducing a link recovery delay and improving link recovery reliability.

In one embodiment, the DCI may be scrambled by using a cell radio network temporary identifier (cell radio network temporary identifier, C-RNTI), or scrambled by using another dedicated radio network temporary identifier RNTI. This is not limited in this embodiment of this application.

It should be understood that, in this operation, the "second resource" that carries the response message of the first request message is different from the "second resource" in operation 303.

305: The network device sends the DCI to the terminal device, and correspondingly, the terminal device receives the DCI sent by the network device. It should be understood that operation 304 and operation 305 may be a same operation.

306: The terminal device determines the second reference signal resource set based on the DCI sent by the network device, and identifies new link information in the second reference signal resource set.

Specifically, the terminal device receives the DCI sent by the network device, and the terminal device identifies a new link in the second reference signal resource set indicated by the DCI.

For example, in a process in which the terminal device identifies a new link, when the terminal device determines that there is a reference signal, in the second reference signal resource set, whose channel quality information is greater than or equal to the second preset threshold, the terminal device may determine, as a new link, the reference signal whose channel quality information is greater than or equal to the second preset threshold.

In one embodiment, the second preset threshold herein may be a link recovery threshold, or may be a reconfigured threshold. This is not limited in this application.

It should be understood that, the second preset threshold may be the first preset threshold.

307: The terminal device sends the second request message to the network device, and correspondingly, the network device receives the second request message sent by the terminal device, where the second request message includes second indication information, and the second indication information is used to indicate a state of a new link identified by the terminal device.

In one embodiment, the second request message may be a second link failure request message (BFRQ 2).

In one embodiment, in operation 306, the terminal device determines the new link from the second reference signal resource set, and when the channel quality information of the new link is greater than or equal to the second preset threshold, the second indication information may include the information about the new link identified by the terminal device, and is reported to the network device by using the second link failure request message (BFRQ 2).

For example, content of the second indication information may be shown in the following Table 5. A value of two bits is used to indicate an identifier of an SCell in which a link failure occurs, and each SCell in which the link failure occurs corresponds to information about an identified new link, such as a beam 0 or a beam 1.

TABLE 5

| Value (SCell identifier) | Information about an identified new link |
| --- | --- |
| 00 | Beam 0 |
| 10 | Beam 2 |

In one embodiment, the information about the new link reported in the second indication information is sequentially sorted in ascending order of the IDs of the SCells indicated in the first indication information.

For example, as shown in the following Table 6, a sequence obtained through sorting based on the IDs of the SCells reported in the first indication information is: C1, C2, and C3, and identified beams are also sorted in an order of the SCell IDs. To be specific, an identifier or value information of an SCell does not need to be reported, and only information about a beam 0, a beam 1, and a beam 2 needs to be reported. The network device may also accurately learn of a new link corresponding to an SCell in which a link failure occurs. This method can reduce resource overheads.

TABLE 6

| Value (SCell identifier) | Information about an identified new link |
| --- | --- |
| C1 | Beam 0 |
| C2 | Beam 1 |
| C3 | Beam 2 |

In another embodiment, in operation 306, when the terminal device determines, from the second reference signal resource set, that no new link satisfies a condition, that is, channel quality information of all links in the second reference signal resource set is less than the second preset threshold, the second indication information is used to indicate that there is no new link (no new beam state), and is reported to the network device by using the second link failure request message (BFRQ 2). Then, operations 304, 305, and 306 are cyclically performed until the terminal device identifies a new link.

For example, in this case, content of the second indication information may be shown in the following Table 7. A value (value) of two bits is used to indicate an identifier of an SCell in which a link failure occurs. When no new link is identified for an SCell in which a link failure occurs, indication information of no beam is reported, to indicate that there is no new link.

TABLE 7

| Value (SCell identifier) | Information about an identified new link |
| --- | --- |
| 00 | No beam |

It should be understood that, in a process in which the terminal device cyclically performs operations 304, 305, and 306 to identify a new link, monitoring may be performed by using a link failure recovery timer (beam failure recovery timer) and a link failure recovery counter (beam failure recovery counter). Specifically, when the terminal device determines that a quantity of no new beam states is greater than or equal to a maximum value of the link failure recovery counter, and still does not receive the BFRR, it may be considered that the link recovery fails. Alternatively, when duration in which the terminal device starts link recovery is longer than or equal to a time length of recovery of the recovery timer, it may be considered that the link recovery fails, and sending of the link failure recovery request message (BFRQ) is stopped and/or timing of the link failure recovery timer and counting of the link failure recovery counter are recovered.

Alternatively, in operation 306, when the terminal device determines, from the second reference signal resource set, that no new link satisfies a condition, that is, channel quality information of all links in the second reference signal resource set is less than the second preset threshold, the second indication information is used to indicate at least one first reference signal, and is reported to the network device by using the second link failure request message (BFRQ 2).

Alternatively, in operation 306, when the terminal device determines, from the second reference signal resource set, that no new link satisfies a condition, that is, channel quality information of all links in the second reference signal resource set is less than the second preset threshold, the second indication information is used to indicate at least one second reference signal, and is reported to the network device by using the second link failure request message (BFRQ 2).

Alternatively, in operation 306, when the terminal device determines, from the first reference signal resource set, that no new link satisfies a condition, that is, channel quality information of all links in the first reference signal resource set is less than the first preset threshold, the second indication information is used to indicate at least one second reference signal, and is reported to the network device by using the second link failure request message (BFRQ 2).

It should be understood that, herein, when the network device does not configure the link recovery threshold for the SCell, and the terminal device detects no new link in the second reference signal resource set, the terminal device may report the at least one first reference signal by using the second indication information. The at least one reported first reference signal is a reference signal with relatively good channel quality in an original set. In this case, the channel quality of the at least one reported first reference signal may be greater than, equal to, or less than the second preset threshold. This is not limited in this application.

In one embodiment, content included in the first request message in operation 303 and content included in the second request message in operation 307 are independently encoded.

In another embodiment, the first request message in operation 303 and the second request message in operation 307 may be a same request message or different request messages. In other words, the first indication information and the second indication information may be sent to the network device by using a same request message, or sent to the network device by using different request messages.

In another embodiment, the first request message in operation 303 and the second request message in operation 307 may be sent by using a same channel, or sent by using different channels. This is not limited in this application.

For example, the terminal device may send the first request message to the network device by using the first resource, receive, by using the second resource, the DCI sent by the network device, and receive a response message of the second request message on a third resource. In one embodiment, the first resource may be a physical uplink shared channel (PUSCH). This is not limited in this application.

It should be understood that, the "second resource" in this operation may be different from the "second resource" in operation 303.

In another embodiment, if the first indication information indicates the first state, the terminal device reports information about K second reference signals in the second reference signal resource set on a preset fourth resource, where the second reference signal resource set is a default resource set or a preset resource set. If the first indication information indicates the second state, the terminal device reports information about K first reference signals in the first reference signal resource set on a preset fourth resource. It should be understood that, the preset fourth resource may be a resource associated with the first resource and/or the second resource. Configuration information of the fourth resource is configured by using one or a combination of a broadcast channel, a system message, an updated system message, layer 1 signaling (DCI), and higher layer signaling (for example, RRC or a MAC-CE). Alternatively, an association relationship between the fourth resource and the first resource/second resource may be configured by using one or a combination of a broadcast channel, a system message, an updated system message, layer 1 signaling (DCI), and higher layer signaling (radio resource control (RRC) signaling or media access control-control element (medium access control-control element, MAC-CE) signaling). In one embodiment, in this implementation, operation 304/305/306 may not be performed.

In one embodiment, when the first indication information is used to indicate that the terminal device identifies no new link, the terminal device does not generate the second indication information or send the second indication information, but waits for QCL that is sent by the network device and that is used to reconfigure a resource set, to perform link recovery. In this way, a recovery probability can be increased after a link failure. Otherwise, when the first indication information indicates that the terminal device identifies a new link, the terminal device generates the second indication information, sends the second indication information, and reports the identified new link to the network device.

In another embodiment, when the first indication information indicates that the terminal device identifies no new link, the reference signal indicated by the second indication information may be an aperiodic/periodic/semi-periodic reference signal in a reference signal resource set (a second reference signal resource set) or the like, or a default reference signal resource set (for example, a reference signal resource set used for beam management BM, a reference signal resource set used for RRM measurement, or a reference signal resource set that uses another function). Otherwise, when the first indication information indicates that the terminal device identifies a new link, the reference signal corresponding to the second indication information is a corresponding reference signal in the candidate beam list.

308: The network device determines information about the new link based on the second indication information or the second request message.

309: The network device sends a link failure recovery response message (BFRR) to the terminal device, and correspondingly, the terminal device receives the link failure recovery response message (BFRR).

310: The terminal device detects the link failure recovery response message (BFRR), and determines that the link recovery succeeds.

Specifically, the terminal device detects the BFRR based on the information about the new link included in the second indication information that is fed back in operation 307. If the terminal device detects BFRR, it is considered that the link failure recovery succeeds. If the terminal device detects no BFRR, the terminal device may perform the process of operations 303 to 307 again until the link failure recovery succeeds.

It should be understood that, in a process in which the terminal device may perform operations 303 to 307 again, monitoring may be performed by using the link failure recovery timer (beam failure recovery timer) and the link failure recovery counter (beam failure recovery counter). Specifically, when a quantity of times that the terminal device sends the link failure recovery request is greater than or equal to the maximum value of the link failure recovery counter, or a time length for link failure recovery exceeds preset duration, it is considered that the link failure recovery fails.

It should be noted that, in the embodiments of this application, the "cell identifier" may alternatively be replaced with a "cell index". Reference signal information may include a reference signal index/an index of an SSB and/or reference signal quality/quality of the SSB.

Based on the foregoing solution, when a link failure occurs and link recovery is performed, if the terminal device determines that no new link is identified, the terminal device may report, to the network device, an identifier of a cell in which the link failure occurs and/or information indicating whether a new link is identified for each cell. The network device may reconfigure a new resource set based on the information, and notify the terminal device of the new resource set by using downlink control information. In other words, a reference signal in another resource set is triggered by using the DCI, and the reference signal in the resource set is reported for link recovery. In this way, a link failure recovery probability can be increased, a link failure recovery delay can be reduced, and link failure recovery reliability can be improved.

It should be understood that, the link failure recovery process may include all or some of the operations described above. This is not limited in this application. For example, a communications system may perform operations 301, 303, 304, 305, 306, and 307, but does not perform operation 302. Alternatively, operations 301 and 303 may be performed, but intermediate operations may not be performed, or subsequent operations may not be performed. Alternatively, operations 301, 303, and 307 may be performed, but intermediate operations are not performed. Alternatively, one or more of the foregoing operations may be performed, or all the operations are performed.

It should be noted that, after determining that there is no new link in operation 302, the terminal device may detect DCI information in the second cell, to determine a new reference signal resource set. After determining that there is a new link, the terminal device may detect response information in the first cell based on the new link.

Figure 4:
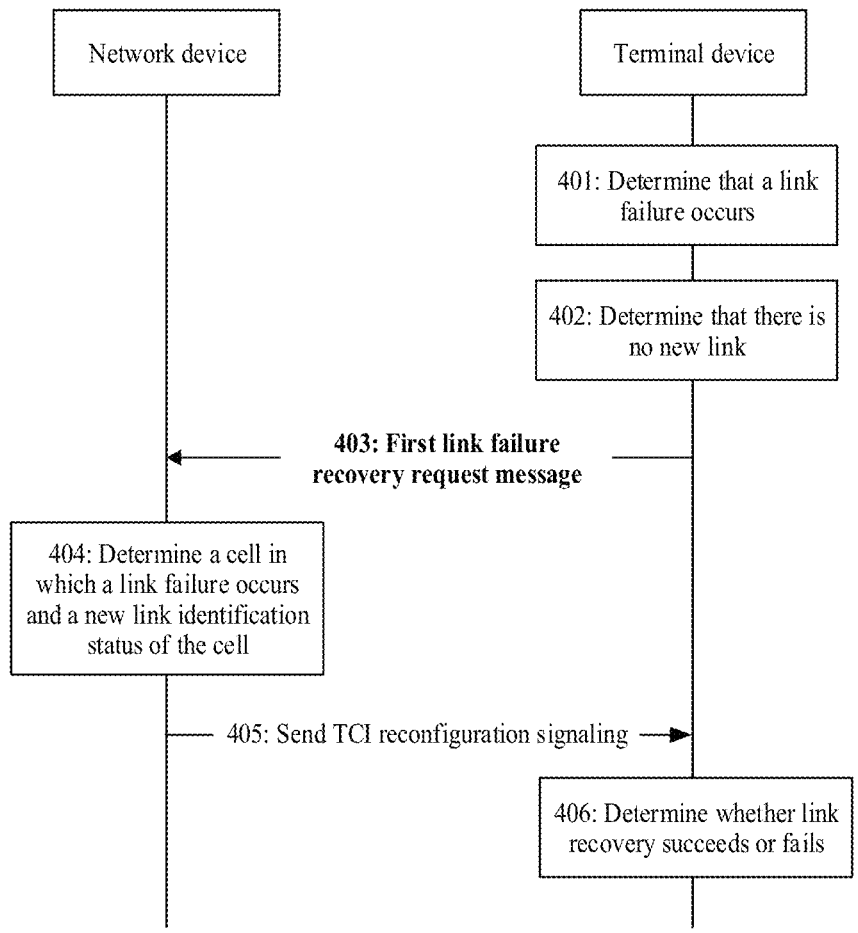
FIG. 4 is a schematic flowchart of another example of a link failure recovery method according to an embodiment of this application.

FIG. 4 is a schematic flowchart of another example of a link failure recovery method according to an embodiment of this application. An example in which a link between an SCell and a terminal device fails is used, and each operation of the method 400 is described in detail by using the terminal device and a network device as execution bodies.

By way of example, and not limitation, the method 400 may alternatively be performed by a chip used in the terminal device and a chip used in the network device. This is not limited in this application.

401: The terminal device detects a working state of a current link. For example, the terminal device may detect the current link, and determine that the current link fails.

402: The terminal device determines that there is no new link.

403: The terminal device sends a first request message to the network device, and correspondingly, the network device receives the first request message sent by the terminal device, where the first request message includes first indication information, and the first indication information is used to indicate that the terminal device has no new link.

404: The network device determines, based on the first indication information, a cell in which a link failure occurs and a new link identification status of the cell.

It should be understood that, for the foregoing operations 401 to 404, refer to operations 301 to 304 in the method 300. For brevity, details are not described herein again.

405: The network device sends a transmission configuration indicator (transmission configuration indicator, TCI) to the terminal device, and correspondingly, the terminal device receives the TCI sent by the network device.

Specifically, when the network device determines that M SCells are in a state in which no new link is identified, the terminal device does not detect link failure recovery response information (BFRR), but waits for TCI reconfiguration signaling. If the TCI reconfiguration signaling is received, it may be considered that link failure recovery succeeds, and timing of a link failure recovery clock is stopped.

Alternatively, if the terminal device receives TCI reconfiguration signaling before a link failure recovery clock expires, and the terminal device receives the information, timing of the link failure recovery clock is stopped; otherwise, if a time length for link failure recovery exceeds preset duration, it is considered that the link failure recovery fails.

Based on the foregoing technical solution, after it is determined that no new link is identified for the cell in which the link failure occurs, the terminal device does not need to detect the link failure recovery response information, but waits for the TCI reconfiguration signaling with low power consumption, so that power can be saved.

It should be noted that, in the embodiments of this application, the first cell may be an SCell, and the second cell may be a PCell or an SCell having an uplink resource.

The foregoing describes in detail the link failure recovery method in the embodiments of this application with reference to FIG. 3 and FIG. 4. The following describes in detail link failure recovery apparatuses in the embodiments of this application with reference to FIG. 5 to FIG. 8.

Figure 5:
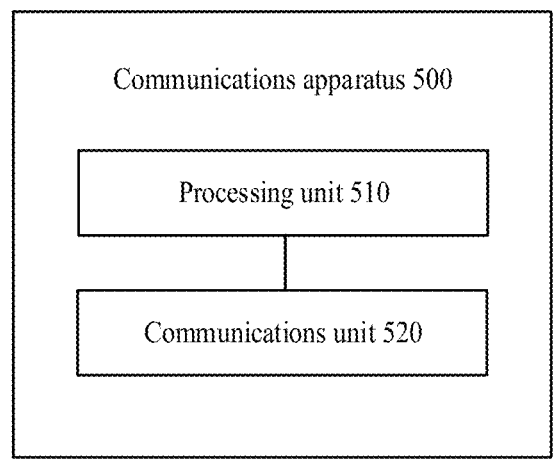
FIG. 5 is a schematic block diagram of an example of a link failure recovery apparatus according to an embodiment of this application.

FIG. 5 is a schematic block diagram of a link failure recovery apparatus 500 according to an embodiment of this application. The apparatus 500 may correspond to the terminal device described in the method 300 and the method 400, or may be a chip or a component used in the terminal device. In addition, modules or units in the apparatus 500 are respectively configured to perform actions or processing processes performed by the terminal device in the method 300 and the method 400. As shown in FIG. 5, the communications apparatus 500 may include a processing unit 510 and a communications unit 520.

The processing unit 510 is configured to determine that M first cells in which a link failure occurs is in a first state, where the first state is a state in which each of the M first cells has no first reference signal that satisfies a first preset condition, M≥1, and M is an integer.

The communications unit 520 is configured to send a first request message on a first resource, where the first request message is used to indicate cell information of the M first cells.

The communications unit 520 is further configured to receive a response message of the first request message on a second resource, where the response message of the first request message is used to indicate a second reference signal resource set, the second reference signal resource set includes resources of N second reference signals used to recover the M first cells, N≥1, and N is an integer.

The processing unit 510 is further configured to determine the second reference signal resource set based on the response message of the first request message.

Specifically, the processing unit 510 is configured to perform 301, 302, and 306 in the method 300 and 401, 402, and 406 in the method 400. The communications unit 520 is configured to perform 303, 305, 307, and 309 in the method 300 and 403 and 405 in the method 400. A specific process in which each unit performs the foregoing corresponding operation is described in detail in the method 400. For brevity, details are not described herein again.

Figure 6:
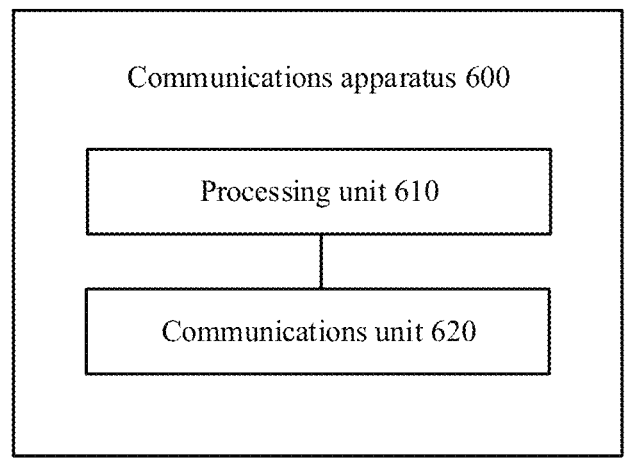
FIG. 6 is a schematic block diagram of another example of a link failure recovery apparatus according to an embodiment of this application.

FIG. 6 is a schematic block diagram of a link failure recovery apparatus 600 according to an embodiment of this application. The apparatus 600 may correspond to (for example, may be applied to or may be) the base station described in the method 300 and the method 400. In addition, modules or units in the apparatus 600 are respectively configured to perform actions or processing processes performed by the base station in the method 300 and the method 400. As shown in FIG. 6, the communications apparatus 600 may include a processing unit 610 and a communications unit 620.

The communications unit 620 is configured to receive a first request message on a first resource, where the first request message is used to indicate cell information of M first cells in which a link failure occurs, the M first cells are in a first state, the first state is a state in which each of the M first cells has no first reference signal that satisfies a first preset condition, M≥1, and M is an integer.

The processing unit 610 is configured to determine the cell information of the M first cells based on the first request message.

The communications unit 620 is further configured to send a response message of the first request message on a second resource, where the response message of the first request message is used to indicate a second reference signal resource set, the second reference signal resource set includes resources of N second reference signals used to recover the M first cells, N≥1, and N is an integer.

Specifically, the processing unit 610 is configured to perform 304 and 308 in the method 300 and 404 in the method 400. The communications unit 620 is configured to perform 303, 305, 307, and 309 in the method 300 and 403 and 405 in the method 400. A specific process in which each unit performs the foregoing corresponding operation is described in detail in the method 300 and the method 400. For brevity, details are not described herein again.

Figure 7:
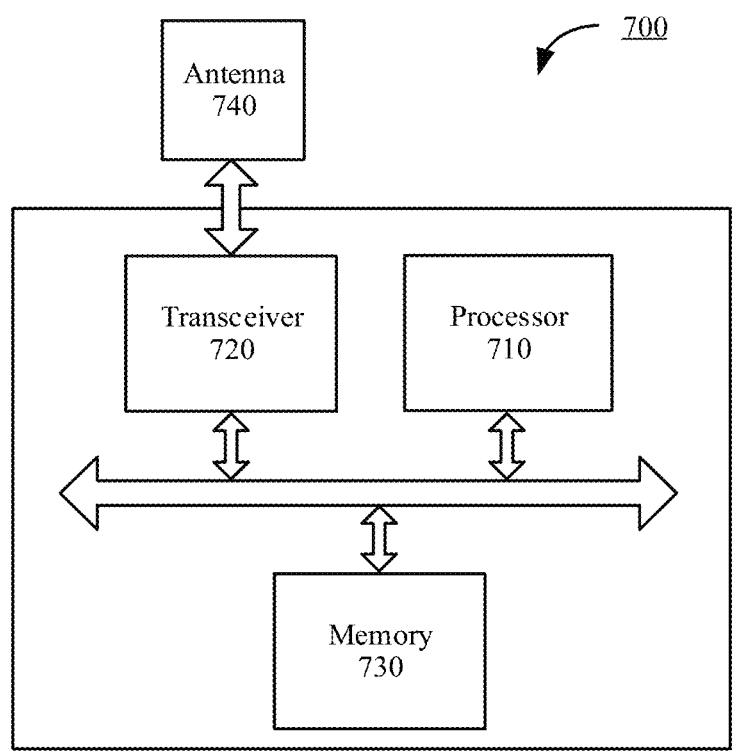
FIG. 7 is a schematic diagram of a structure of a terminal device according to an embodiment of this application.

FIG. 7 is a schematic diagram of a structure of a terminal device 700 according to an embodiment of this application. As shown in FIG. 7, the terminal device 700 includes a processor 710 and a transceiver 720. In one embodiment, the terminal device 700 further includes a memory 730. The processor 710, the transceiver 720, and the memory 730 communicate with each other through an internal connection path, to transfer a control signal and/or a data signal. The memory 730 is configured to store a computer program. The processor 710 is configured to invoke the computer program from the memory 730 and run the computer program, to control the transceiver 720 to send and receive a signal.

The processor 710 and the memory 730 may be integrated into one processing apparatus. The processor 710 is configured to execute program code stored in the memory 730 to implement the function of the terminal device in the foregoing method embodiments. During specific implementation, the memory 730 may alternatively be integrated into the processor 710, or may be independent of the processor 710. The transceiver 720 may be implemented by using a transceiver circuit.

The terminal device may further include an antenna 740, configured to send, by using a radio signal, uplink data or uplink control signaling output by the transceiver 720, or send, after receiving downlink data or downlink control signaling, the downlink data or the downlink control signaling to the transceiver 720 for further processing.

It should be understood that, the apparatus 700 may correspond to the terminal device in the method 300 and the method 400 according to the embodiments of this application, and the apparatus 700 may alternatively be a chip or a component used in the terminal device. In addition, modules in the apparatus 700 implement corresponding procedures in the method 300 in FIG. 3 and the method 400 in FIG. 4. Specifically, the memory 730 is configured to store program code, so that when the processor 710 executes the program code, the processor 710 is controlled to perform 301, 302, and 306 in the method 300 and 401, 402, and 406 in the method 400. The transceiver 720 is configured to perform 303, 305, 307, and 309 in the method 300 and 403 and 405 in the method 400. A specific process in which each unit performs the foregoing corresponding operation is described in detail in the method 400. For brevity, details are not described herein again.

Figure 8:
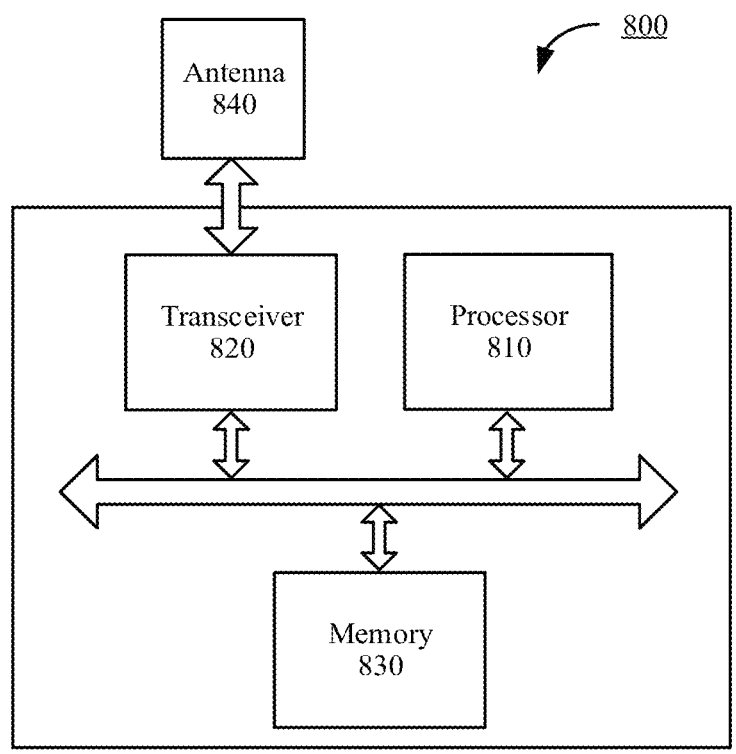
FIG. 8 is a schematic diagram of a structure of a network device according to an embodiment of this application.

FIG. 8 is a schematic diagram of a structure of a network device 800 according to an embodiment of this application. As shown in FIG. 8, the network device 800 (for example, a base station) includes a processor 810 and a transceiver 820. In one embodiment, the network device 800 further includes a memory 830. The processor 810, the transceiver 820, and the memory 830 communicate with each other through an internal connection path, to transfer a control signal and/or a data signal. The memory 830 is configured to store a computer program. The processor 810 is configured to invoke the computer program from the memory 830 and run the computer program, to control the transceiver 820 to send and receive a signal.

The processor 810 and the memory 830 may be integrated into one processing apparatus. The processor 810 is configured to execute program code stored in the memory 830 to implement the function of the base station in the foregoing method embodiments. During specific implementation, the memory 830 may alternatively be integrated into the processor 810, or may be independent of the processor 810. The transceiver 820 may be implemented by using a transceiver circuit.

The network device may further include an antenna 840, configured to send, by using a radio signal, downlink data or downlink control signaling output by the transceiver 820, or send, after receiving uplink data or uplink control signaling, the uplink data or the uplink control signaling to the transceiver 820 for further processing.

It should be understood that, the apparatus 800 may correspond to the base station in the method 300 and the method 400 according to the embodiments of this application, and the apparatus 800 may alternatively be a chip or a component used in the base station. In addition, modules in the apparatus 800 implement corresponding procedures in the method 300 in FIG. 3 and the method 400 in FIG. 4. Specifically, the memory 830 is configured to store program code, so that when the processor 810 executes the program code, the processor 810 is controlled to perform 304 and 308 in the method 300 and 404 in the method 400. The transceiver 820 is configured to perform 303, 305, 307, and 309 in the method 300 and 403 and 405 in the method 400. A specific process in which each unit performs the foregoing corresponding operation is described in detail in the method 400. For brevity, details are not described herein again.

It should be understood that, in the embodiments of this application, the first request message and the second request message may be same request information, for example, are collectively referred to as the first request message. In this case, "not sending the second request message" may be understood as "not sending the second indication information"; or may be understood as that the first request message does not include the second indication information; or may be understood as that the first request message includes only the first indication information.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. Division into the units is merely logical function division and may be other division during actual implementation. For example, a plurality of units or components may be combined. In addition, the displayed or discussed mutual couplings or communication connections may be indirect couplings or communication connections through some interfaces, apparatuses, or units.

In addition, functional units in the embodiments of this application may be integrated into one physical entity, or each of the units corresponds to one physical entity, or two or more units are integrated into one physical entity.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A link failure recovery method, comprising:
   determining that a link failure occurs in a plurality of first cells;
   sending a first request message comprising first indication information to indicate cell information of the plurality of first cells, wherein
   the first indication information comprises a first part of content and a second part of content, wherein the first part of content is to indicate cell identifiers of the plurality of first cells, and wherein the second part of content is to indicate whether there is no first reference signal that satisfies a first preset condition; and
   sending a second request message comprising second indication information to indicate information about a reference signal for recovering the plurality of first cells,
   wherein, in response to the second part of content indicates a first state in which each of the plurality of first cells has no first reference signal that satisfies the first preset condition, the second request message is not sent.

2. The method according to claim 1, wherein
   the second part of content is to indicate whether each of the plurality of first cells has no first reference signal that satisfies the first preset condition; or
   the second part of content is to indicate whether all of the plurality of first cells have no first reference signal that satisfies the first preset condition.

3. A link failure recovery method, comprising:
   receiving a first request message comprising first indication to indicate cell information of a plurality of first cells in which a link failure occurs, wherein the first indication information comprises a first part of content and a second part of content, wherein the first part of content is to indicate cell identifiers of the plurality of first cells, and wherein the second part of content is to indicate whether there is no first reference signal that satisfies a first preset condition;
   determining the cell information of the plurality of first cells based on the first request message; and
   receiving a second request message comprising second indication information to indicate information about a reference signal for recovering the plurality of first cells,
   wherein, in response to the second part of content indicates a first state in which each of the plurality of first cells has no first reference signal that satisfies the first preset condition, the second request message is not received.

4. The method according to claim 3, wherein
   the second part of content is to indicate whether each of the plurality of first cells has no first reference signal that satisfies the first preset condition; or
   the second part of content is to indicate whether all of the plurality of first cells have no first reference signal that satisfies the first preset condition.

5. A link failure recovery apparatus, comprising:
   a processor, configured to determine that a link failure occurs in a plurality of first cells; and
   a transceiver, configured to:
      send a first request message comprising first indication information to indicate cell information of the plurality of first cells, wherein
      the first indication information comprises a first part of content and a second part of content, wherein the first part of content is to indicate cell identifiers of the plurality of first cells, and wherein the second part of content is to indicate whether there is no first reference signal that satisfies a first preset condition; and
      send a second request message comprising second indication information to indicate information about a reference signal for recovering the plurality of first cells,
      wherein, in response to the second part of content indicates a first state in which each of the plurality of first cells has no first reference signal that satisfies the first preset condition, the second request message is not sent.

6. The apparatus according to claim 5, wherein
   the second part of content is to indicate whether each of the plurality of first cells has no first reference signal that satisfies the first preset condition; or
   the second part of content is to indicate whether all of the plurality of first cells have no first reference signal that satisfies the first preset condition.

7. A link failure recovery apparatus, comprising:
   a transceiver, configured to receive a first request message comprising first indication information to indicate cell information of a plurality of first cells, the plurality of first cells are cells in which a link failure occurs, wherein the first indication information comprises a first part of content and a second part of content, wherein the first part of content is to indicate cell identifiers of the plurality of first cells, and wherein the second part of content is to indicate whether there is no first reference signal that satisfies a first preset condition; and
   a processor, configured to determine the cell information of the plurality of first cells based on the first request message; and
   the transceiver is further configured to receive a second request message comprising second indication information to indicate information about a reference signal for recovering the plurality of first cells,
   wherein, in response to the second part of content indicates a first state in which each of the plurality of first cells has no first reference signal that satisfies the first preset condition, the second request message is not received.

8. The apparatus according to claim 7, wherein
   the second part of content is to indicate whether each of the plurality of first cells has no first reference signal that satisfies the first preset condition; or
   the second part of content is to indicate whether all of the plurality of first cells have no first reference signal that satisfies the first preset condition.

9. A computer-readable storage medium, wherein the computer-readable storage medium stores a computer program; and when the computer program is executed, the method according to claim 1 is implemented.

10. A computer-readable storage medium, wherein the computer-readable storage medium stores a computer program; and when the computer program is executed, the method according to claim 3 is implemented.

11. A chip system, wherein the chip system comprises:
a memory, configured to store instructions; and
a processor, configured to: invoke the instructions from the memory and run the instructions, to enable a communications device onto which the chip system is installed to perform the method according to claim 1.

12. A chip system, wherein the chip system comprises:
a memory, configured to store instructions; and
a processor, configured to: invoke the instructions from the memory and run the instructions, to enable a communications device onto which the chip system is installed to perform the method according to claim 3.

* * * * *